United States Patent
Katoh et al.

(10) Patent No.: US 7,277,217 B1
(45) Date of Patent: Oct. 2, 2007

(54) OPTICAL DEFLECTING DEVICE, OPTICAL DEFLECTING DEVICE MANUFACTURING METHOD, AND OPTICAL PROJECTING DEVICE

(75) Inventors: Seiichi Katoh, Miyagi (JP); Takeshi Nanjyo, Hyogo (JP); Koichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/681,021

(22) Filed: Mar. 1, 2007

(30) Foreign Application Priority Data

Mar. 1, 2006 (JP) .............................. 2006-055050

(51) Int. Cl.
*G02B 26/00* (2006.01)
(52) U.S. Cl. .................. 359/291; 359/295; 359/298; 359/223; 359/224; 359/318
(58) Field of Classification Search ................ 359/223, 359/224, 290–292, 295, 298, 318; 345/85, 345/108; 348/770, 771
See application file for complete search history.

(56) References Cited

U.S. PATENT DOCUMENTS

| 6,522,452 | B2 * | 2/2003 | Wood .......................... 359/290 |
| 6,628,447 | B1 * | 9/2003 | Want et al. .................. 345/108 |
| 6,700,688 | B2 * | 3/2004 | Vaganov ...................... 359/223 |
| 6,738,177 | B1 * | 5/2004 | Gutierrez et al. ........... 359/298 |
| 6,900,915 | B2 | 5/2005 | Nanjyo et al. |
| 6,947,195 | B2 | 9/2005 | Ohtaka et al. |
| 7,042,621 | B2 * | 5/2006 | Maeda et al. ................ 359/290 |
| 7,050,217 | B2 | 5/2006 | Nanjyo et al. |
| 7,064,878 | B2 | 6/2006 | Nanjyo et al. |
| 7,075,562 | B2 | 7/2006 | Ohtaka et al. |
| 7,099,060 | B2 * | 8/2006 | Nanjyo et al. .............. 359/223 |
| 7,113,321 | B2 | 9/2006 | Nanjyo et al. |
| 7,166,486 | B2 | 1/2007 | Ohtaka et al. |
| 7,167,290 | B2 | 1/2007 | Katoh et al. |
| 2002/0181069 | A1 * | 12/2002 | Brown et al. ................ 359/290 |

(Continued)

FOREIGN PATENT DOCUMENTS

JP    2002-525676    8/2002

(Continued)

OTHER PUBLICATIONS

Larry J. Hornbeck, "Deformable-Mirror Spatial Light Modulators", SPIE Critical Reviews Series, vol. 1150, 1989, pp. 86-102.

(Continued)

*Primary Examiner*—Evelyn A. Lester
(74) *Attorney, Agent, or Firm*—Oblon, Spivak, McClelland, Maier & Neustadt, P.C.

(57) ABSTRACT

Bearing portions having an approximately arc shape are provided on a lower surface of a plate-shaped member. In the bearing portions, stoppers of a regulating member are embedded. With the engagement of the lower surface of the plate-shaped member and the apex of a pivot member and the engagement of an inner surface of the bearing portions and a lower surface of the stoppers, the plate-shaped member is rotatably supported with the apex of the pivot member as a center. With a side surface of the regulating member 109 facing a side surface of the bearing portions, the position of the plate-shaped member in a rotation axis direction is regulated.

8 Claims, 20 Drawing Sheets

U.S. PATENT DOCUMENTS

| | | |
|---|---|---|
| 2004/0150872 A1* | 8/2004 | Neukermans et al. ....... 359/291 |
| 2005/0248862 A1 | 11/2005 | Nanjo et al. |
| 2006/0103912 A1 | 5/2006 | Katoh et al. |
| 2006/0104597 A1 | 5/2006 | Nanjo et al. |
| 2006/0109539 A1 | 5/2006 | Katoh et al. |
| 2006/0171015 A1 | 8/2006 | Nanjyo et al. |
| 2006/0187514 A1 | 8/2006 | Nanjyo et al. |
| 2006/0198007 A1* | 9/2006 | Orcutt et al. ............... 359/224 |
| 2006/0239009 A1 | 10/2006 | Nanjyo et al. |

FOREIGN PATENT DOCUMENTS

| | | |
|---|---|---|
| JP | 3411014 | 3/2003 |
| JP | 3492400 | 11/2003 |
| JP | 2004-78136 | 3/2004 |
| JP | 2004-138881 | 5/2004 |
| JP | 2005-195798 | 7/2005 |
| JP | 2006-133394 | 5/2006 |

OTHER PUBLICATIONS

Peter F. Van Kessel, et al., "A MEMS-Based Projection Display", Proceedings of the IEEE, vol. 86, No. 8, Aug. 1998, pp. 1687-1704.

Chang-Hyeon Ji, et al., "Design, Fabrication, and Experiment of Micromirror with Aluminum Pin-Joints", Micro Opto Electro Mechanical Systems—MOEMS, 1999, pp. 44-48.

\* cited by examiner

PLAN VIEW

A-B CROSS SECTION

C-D CROSS-SECTION

SIDE VIEW

PLAN VIEW

A-B CROSS-SECTION

C-D CROSS-SECTION

SIDE VIEW

A-B CROSS-SECTION

PLAN VIEW

PLAN VIEW

A-B CROSS-SECTION

C-D CROSS-SECTION

SIDE VIEW

A-B CROSS-SECTION

PLAN VIEW

OPTICAL DEFLECTING DEVICE, OPTICAL DEFLECTING DEVICE MANUFACTURING METHOD, AND OPTICAL PROJECTING DEVICE

CROSS-REFERENCE TO RELATED APPLICATIONS

The present document incorporates by reference the entire contents of Japanese priority document, 2006-055050 filed in Japan on Mar. 1, 2006.

BACKGROUND OF THE INVENTION

1. Field of the Invention

The present invention relates to an optical deflecting device that changes the direction of output light with respect to incident light and a method of manufacturing such an optical deflecting device, and also relates a technology suitable for image forming apparatuses, such as electrophotographic printers and copiers, and projection-type image and vide display apparatuses, such as projectors and digital theater systems.

2. Description of the Related Art

L. J. Hornbeck has disclosed digital micromirror device with a torsion beam hinge in Proceedings, The International Society for Optical Engineering (SPIE), vol. 1150, pp. 86-102 (1989). This technology has been expanded as disclosed in Proceedings of The Institute of Electrical and Electronics Engineers (IEEE), vol. 86, No. 8, pp. 1687-1704 (1998) by P .F. Van Kessl and J. Hornbeck, in which spatial light modulating device having a group of micromirrors is disclosed and called a Digital Micromirror Device (DMD) for use in image projecting device.

In these micromirror devices, mirrors are generally supported by a torsion beam called a hinge. By using the hinge, the reflection area is reduced. However, a DMD from Texas Instruments Incorporated has a two-storied structure provided with a reflecting member on the surface separately from the hinge portion. Also, with the use of the hinge, the actual voltage to be driven is as much as several tens of volts. However, for control on the order of 5 volts to 7.5 volts as data for switching the tilting direction, a bias voltage of several tens of volts to be applied all at one to a plurality of pixels and a restoring force of a special spring member are combined to switch the tilt.

Also, in a micromirror device reported in Micro Opto Electro Mechanical Systems-MOEMS '99 by Chang-Hyeon Ji and Yong Kweon Kim, a bearing-shaped hinge on a substrate without stiffness is used.

Furthermore, the inventors have submitted a patent application that discloses an optical deflecting device in which, with a displacement due to electrostatic attraction according to a potential applied to a member having a light reflecting area, a light beam incident to the light reflecting area is deflected with a reflecting direction being changed. The optical deflecting device includes a substrate, a plurality of regulating members, a pivot member, and a plate-shaped member. The regulating members each has a stopper on an upper portion and are provided to a plurality of ends. The pivot member has an apex formed of a conductive material and is provided on an upper surface of the substrate. The plate-shaped member does not have a fixed end, has the light reflecting area on an upper surface, and at least partially has a conductive material layer formed of a conductive member. At least a contact point making contact with the apex on a back surface is formed of a conductive member. The plate-shaped member is movably disposed within a space formed of the substrate, the pivot member, and the stopper, and provides a potential of the plate-shaped member through a contact with the pivot member (refer to Japanese Patent Application Laid-Open No. 2004-78136). Still further, the inventors have also submitted a patent application that discloses the invention having a bearing structure in which a plate-shaped member has formed thereon a notch and a protrusion (refer to Japanese Patent Application Laid-Open No. 2005-195798).

Other examples of the conventional technology include those disclosed in Japanese Patent Application Laid-Open No. 2004-138881, Japanese Patent No. 3492400, Japanese Patent No. 3411014, and Japanese National Phase PCT Laid-Open No 2002-525676.

In the spatial light modulator and optical deflecting device using a hinge, with the restoring force due to the stiffness of the hinge, the driving voltage is high, as much as several tens of volts. In high-definition and high-resolution television, for example, high-definition and high-resolution is required, and the number of pixels tend to be increased. When the number of pixels is increased, the chip size is expanded. In that case, a special process is required, and material cost is increased. Thus, the mirror dimension forming a pixel is required to be decreased. With this, the stiffness of the hinge hanging the mirror is increased, thereby increasing the driving voltage. For further downsizing, it is not easy to decrease the stiffness of the hinge because of limitations of microfabrication accuracy for making the hinge narrower. Moreover, if the stiffness of the hinge is tried to be weakened to decrease the driving voltage even for the purpose other than downsizing, the hinge is bent, and cannot sustain the center position of the mirror. Still further, when the hinge is used, the hinge is formed on the surface, and therefore the area that reflects light is decreased. To get around this problem, a complex structure has to be adopted in which a reflecting surface is formed on a driving electrode hanged by the hinge to form a double structure so as to increase the reflecting area. Still further, a post is formed to superpose the mirror on the electrode, but since the post has a hole, the mirror inevitably has an area where light cannot be reflected, thereby inviting a decrease in reflection efficiency. From these reason above, in the structure using a hinge, there is a problem in which downsizing results in a complex element structure and high manufacturing cost.

In the device reported by Chang-Hyeon Ji and Yong Kweon Kim, a simple bearing-shaped hinge is used. However, since the plated-shaped shaft moves within a rectangular frame, stability is low. Also, there are problems in which it is difficult to process a brace of the mirror and it is also difficult to downsize the mirror to a cube measuring 10 micrometers per side. Ensuring the accuracy of the bearing-shaped hinge is difficult. When mirrors are arranged in an array with high density to narrow a space between the mirrors, which may cause a loss of incident light, a problem of collision between adjacent mirrors occurs. Even in Japanese Patent Application Laid-Open No. 2005-195798, a constriction, a hole, and a protrusion are provided to the plate-shaped member, and therefore the light reflecting area of the plate-shaped member is sacrificed.

SUMMARY OF THE INVENTION

It is an object of the present invention to at least partially solve the problems in the conventional technology.

According to an aspect of the present invention, an optical deflecting device includes a substrate; a pivot member formed on the substrate; a regulating member formed on the substrate; a plate-shaped member having an upper surface as a light reflecting surface; and a group of electrodes formed on the substrate. The plate-shaped member has a loop-shaped bearing portion on a lower surface side, the regulating member has a stopper protruding in approximately parallel to the substrate and embedded inside the bearing portion, with an engagement of the lower surface of the plate-shaped member and an apex of the pivot member and an engagement of an inner surface of the bearing portion and a lower surface of the stopper, the plate-shaped member is rotatably supported with the apex of the pivot member as a center, and a position of the plate-shaped member in a rotation axis direction is regulated by a side surface of the regulating member facing a side surface of the bearing portion, and with an electrostatic force generated between the group of electrodes and the plate-shaped member, the plate-shaped member is rotated with the apex of the pivot member as the center, thereby changing a reflecting direction of a light beam incident to the light reflecting surface of the plate-shaped member.

According to another aspect of the present invention, a method of manufacturing the optical deflecting device includes, after planarizing a photoresist serving as a sacrifice layer, forming a concave surface corresponding to the bearing portion through etching process; next forming a film made of a material serving as the lower layer of the plate-shaped member; next forming and patterning a sacrifice layer along the concave surface; and next forming a film serving as the stopper of the regulating member.

According to still another aspect of the present invention, an optical projecting device includes the above optical deflecting device; a light source that light up a light reflecting surface of a plate-shaped member of the optical deflecting device; and an optical system that projects light reflected from the light reflecting surface when the plate-shaped member of the optical deflecting device is tilted in a first tilting direction, and shields light reflected from the light reflecting surface and prevents the light from being projected outside when the plate-shaped member is tilted in a second tilting direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1A:
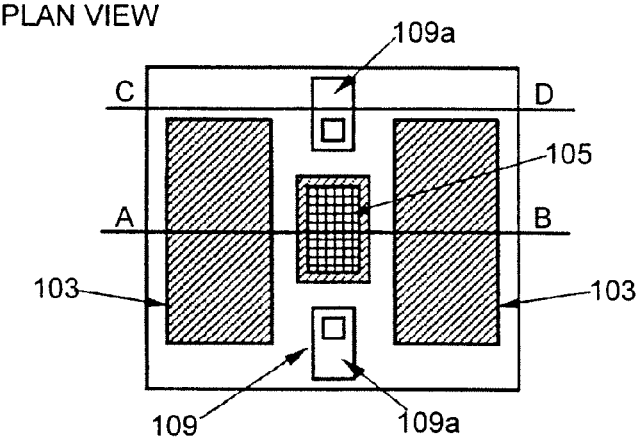
FIGS. 1A to 1D are drawings of the structure of an optical deflecting device according to a first embodiment of the present invention.

Exemplary embodiments of the present invention are explained below. To avoid redundancy of explanation, in the drawings referred to in the following explanation, same portion or corresponding portions are provided with the same reference numerals.

FIGS. 1A to 1D and 2 are drawings of the structure of an optical deflecting device according to the present embodiment. FIGS. 3A, 3B, and 4 to 12 are drawings for explaining an optical deflecting device manufacturing method according to the present embodiment.

Figure 1B:
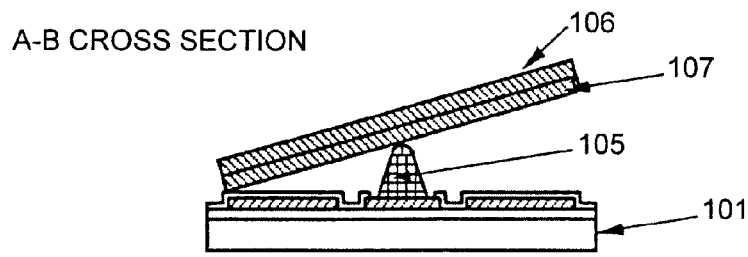
Figure 1C:
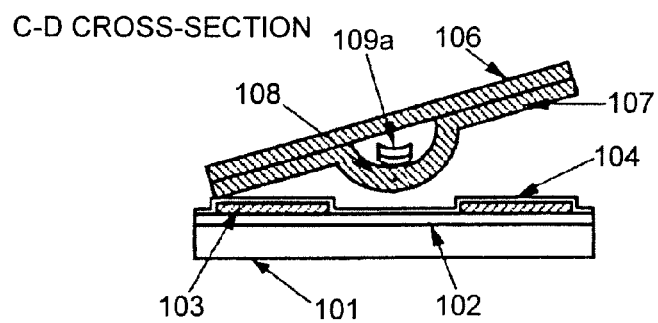
Figure 1D:
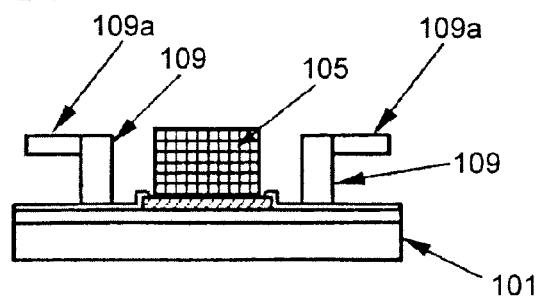

FIG. 1A is a schematic plan view of the optical deflecting device (a plate-shaped member acting as a movable mirror is omitted). FIG. 1B is an A-B schematic cross-section view. FIG. 1C is a C-D schematic cross-section view. FIG. 1D is a schematic side view. Here, in FIG. 1A, the plate-shaped member acting as a movable mirror is omitted because it covers the entire surface. Also in FIG. 1D, the plate-shaped member is omitted.

The optical deflecting device according to the present embodiment includes a silicon substrate 101. On this silicon substrate 101, an oxide film 102 is formed for insulation, on which a pivot member 105 is formed. Also, a group of electrodes 103 is formed, and is then covered with an insulating film 104, such as an oxide film. A conductive plate-shaped member 106 having a light reflecting area is provided. This plate-shaped member 106 has a structure in which it is rotatably supported like a seesaw, with the apex of the pivot member 105 as a pivot. This plate-shaped member 106 is tilted in a direction depicted in FIG. 1B (first tilting direction) or in a reverse direction (second tilting direction). The tilt angle is an approximately arcsin (arcsine) of a value obtained by dividing the height of the pivot member 105 by the half of the length of the plate-shaped member 106.

The plate-shaped member 106 is formed of two layers, that is, an upper layer and a lower layer. On a lower layer 107, a pair of bearing portions 108 formed in a loop is formed for rotatably supporting the plate-shaped member 106. In the present embodiment, the bearing portions 108 have an arc cross-section. Here, the bearing portions 108 are disposed on an end side not engaging the pivot member 105 of the plate-shaped member 106. As most clearly depicted in FIG. 1D, a pair of regulating members 109 is provided so as to correspond to the pair of bearing portions 108. The regulating members 109 each has a stopper 109a protruding externally in approximately parallel to the silicon substrate 101. This stopper 109a has a positional relation as depicted in FIG. 1C in which the stopper 109a enters the bearing portion 108 from the inside and engages the inner surface of the bearing portion 108. Also, the stopper 109a has an arc-shaped cross-section, and its radius of curvature is approximately equal to the radius of curvature of the inner surface of the bearing portion 108.

Figure 2:
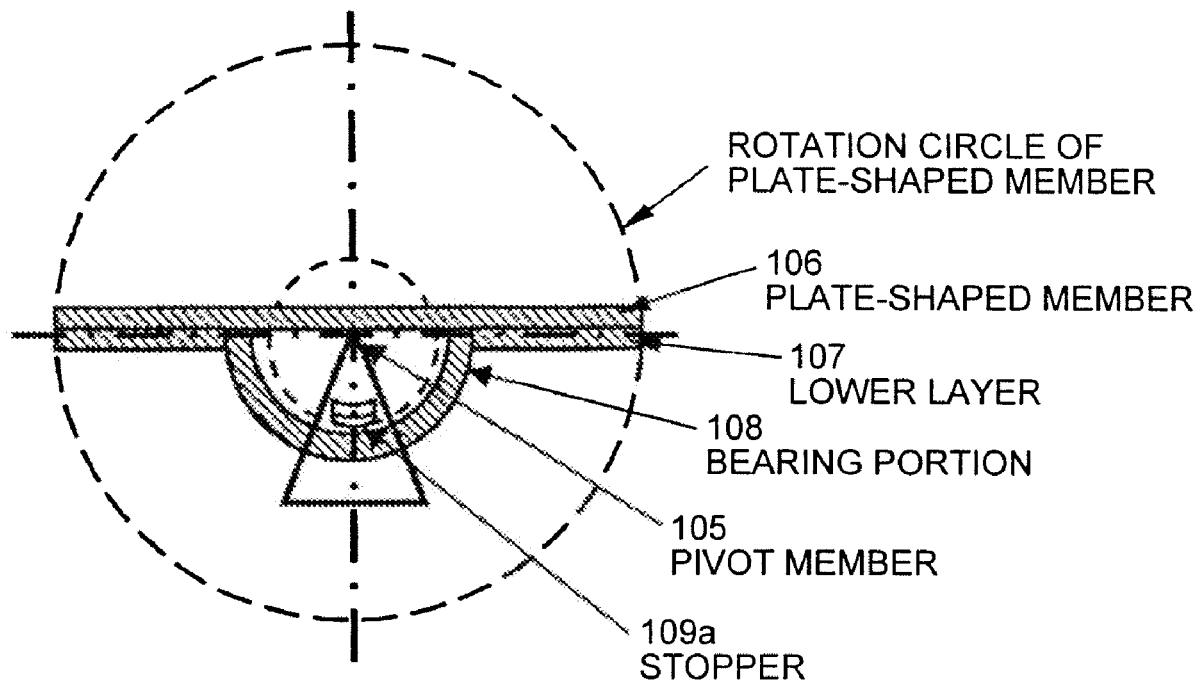
FIG. 2 is a drawing for explaining a rotational supporting structure of a plate-shaped member.

FIG. 2 is a drawing for explaining a rotational supporting scheme of the plate-shaped member 106. As depicted in the drawing, with the contact between the bearing portion 108 and the stopper 109a and the contact between the plate-shaped member 106 and the pivot member 105, the rotation center of the plate-shaped member 106 is determined. Since the radius of curvature of the inner surface of the bearing portion 108 is approximately equal to the radius of curvature of the stopper 109a, the plate-shaped member 106 can smoothly rotate with the apex of the pivot member 105 as the rotation center. Movement of the plate-shaped member 106 in a rotation axis direction is regulated by vertical side surfaces of the regulating members 109 facing the side surfaces of the bearing portions 108.

Here, the loop-shaped bearing portions 108 preferably have an arc cross-section as in the present embodiment, but can have a polyhedron cross-section. Also, the lower layer 107 of the plate-shaped member 106 is a conductor, such as metal, but can be an insulator.

With the regulating members 109 and the stoppers 109a being conductors and their potential being equal to the potential of the pivot member 105, even when the plate-shaped member 106 is separated from the pivot member 105 at the time of rotation, the bearing portions 108 and the stopper 109a are in contact with each other, thereby making the potential of the plate-shaped member 106 equal to the potential of the pivot member 105. The probability of the plate-shaped member 106 electrically making contact with the pivot member 105 and the stoppers 109a is higher compared with the probability of the plate-shaped member 106 electrically making contact with only the pivot member 105, thereby allowing more stable operation. By controlling the potential of the pivot member 105, the potential of the plate-shaped member 106 is established. Also, with an electrostatic force from a difference with the potential provided to the group of electrodes 103, the tilting direction of the plate-shaped member 106 can be switched between the first tilting direction and the second tilting direction. Therefore, the direction in which the light beam incident to the plate-shaped member 106 is reflected can be switched. Here, such a mechanism of driving of the plate-shaped member 106 is disclosed in detail in Japanese Patent Application Laid-Open No. 2004-78136, and therefore is not explained further more.

The bearing portions 108 are formed on the lower layer 107 side opposite to the light reflecting surface of the plate-shaped member 106. Therefore, since the upper surface of the plate-shaped member 106 does not have a hole or the like, the entire upper surface of the plate-shaped member 106 can be used as a light reflecting area. Thus, when the optical deflecting devices according to the present embodiment are disposed in a two-dimensional array and a light beam is launched from an external light source, a ration of reflecting the incident light beam is determined by the area of the plate-shaped member 106 of each optical deflecting device and a space area between each of the plate-shaped members 106 of adjacent optical deflecting devices, and can be increased to, for example, approximately 91 percent.

Next, a typical process of manufacturing an optical deflecting device explained above is explained. Here, it is assumed that the size of the plate-shaped member 106 measures 10 micrometers per side and its tilt angle is 10 degrees.

Figure 3A:
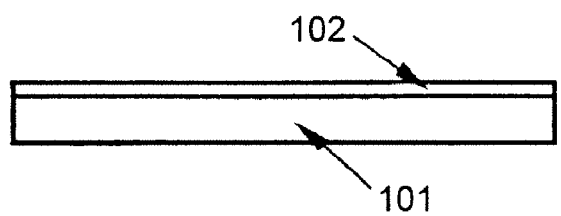
FIGS. 3A and 3B are drawings for explaining an optical deflecting device manufacturing method according to the first embodiment.

Step a: As depicted in FIG. 3A, on a silicon wafer serving as the silicon substrate 101, an insulating film 102 is formed.

Figure 3B:
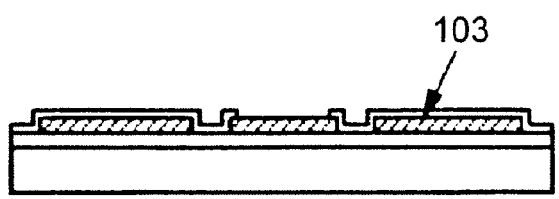

Step b: As depicted in FIG. 3B, an Al film serving as the group of electrodes 103 is formed through spattering so as to have a thickness of 200 nanometers, and is then patterned through photolithography by using an organic resist. Then, etching is performed through Reactive Ion etching (RIE) with $Cl_2$ gas to form electrodes. Through a plasma chemical-vapor deposition (CVD) with mixed gas of $SiH_4$ and $N_2O$, an oxide film, which is a protective insulating film 104, is formed so as to have a thickness of 250 nanometers.

Figure 4:
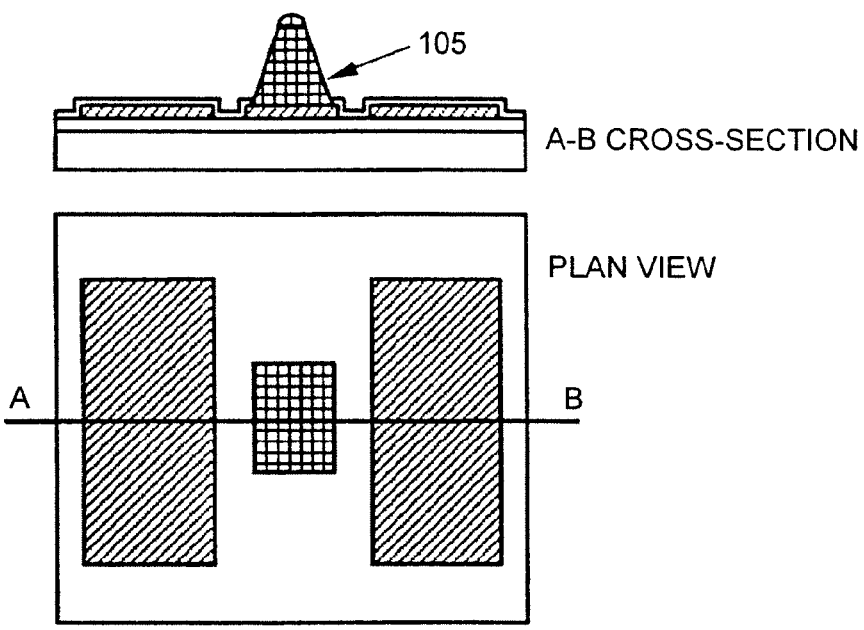
FIG. 4 is a drawing for explaining continuation of the manufacturing method shown in FIG. 3B.

Step c: As depicted in FIG. 4, the protective insulating film 104 is etched through photolithography and RIE with mixed gas of $CF_4$ and $H_2$ to open the insulating film. A tungsten W film is then formed so as to have a thickness of 1 micrometer and, by using a photomask with gradation, the pivot member 105 is formed through photolithography so as to have a height of 0.87 micrometers.

Figure 5:
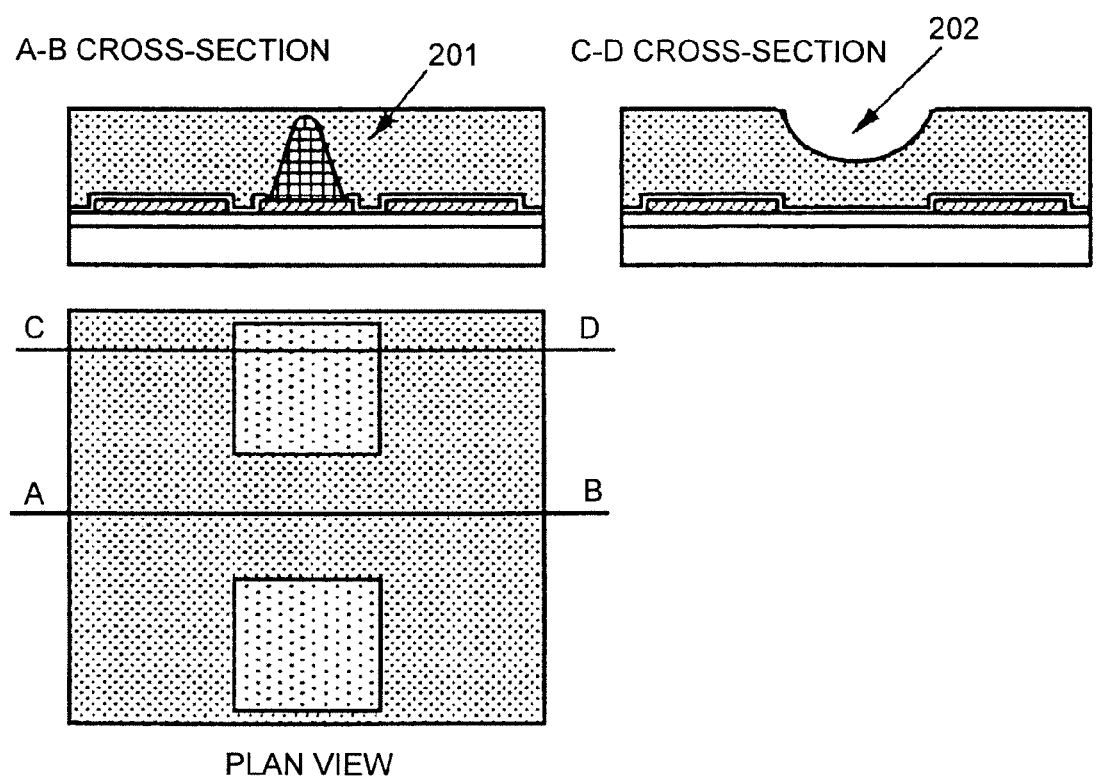
FIG. 5 is a drawing for explaining continuation of the manufacturing method shown in FIG. 4.

Step d: As depicted in FIG. 5, a novolac photoresist serving as a sacrifice layer 201 is applied, and is then planarized through Chemical Mechanical Polishing (CMP). By using the photomask with gradation, a concave surface 202 is formed from the photoresist so as to have an arc-shaped cross-section. This concave surface 202 serves as a basic pattern of the loop shape of the bearing portions 108 on the lower layer 107 of the plate-shaped member 106. At this time, the gradation of the photomask is set so that the concave surface 202 has a predetermined curvature.

Figure 6:
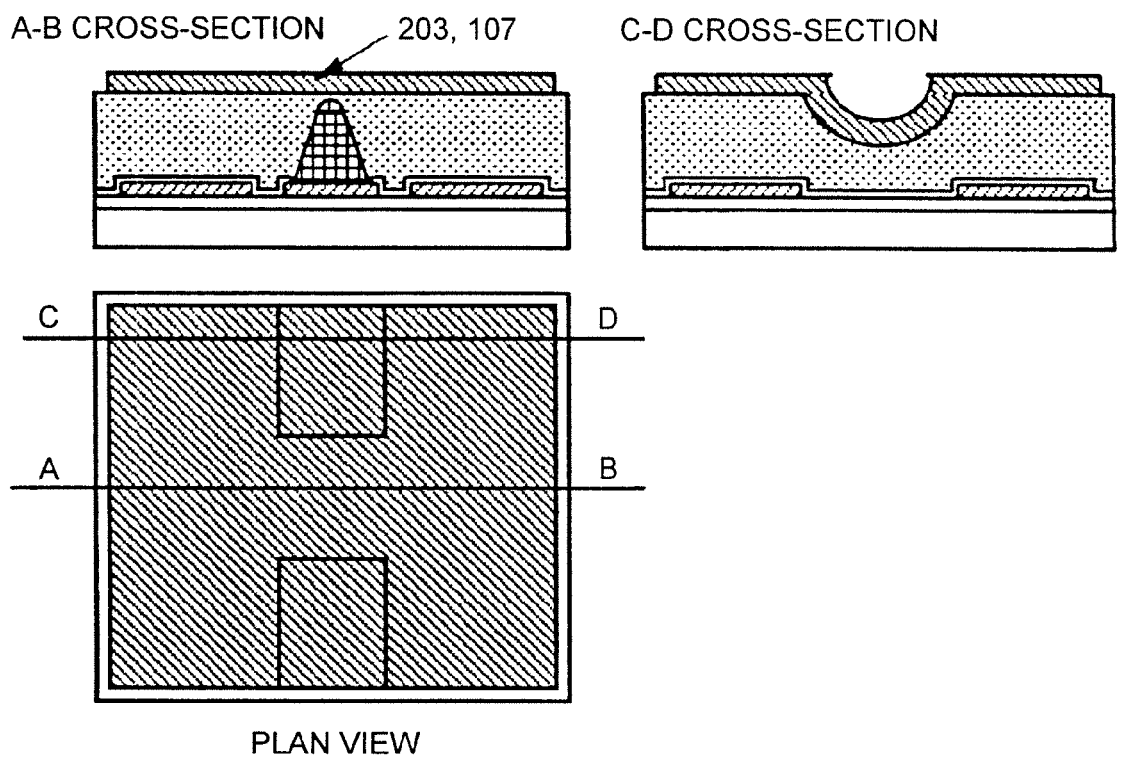
FIG. 6 is a drawing for explaining continuation of the manufacturing method shown in FIG. 5.

Step e: As depicted in FIG. 6, a metal film 203, such as Al or Al—Ti alloy, for example, serving as the lower layer 107 of the plate-shaped member 106 is formed so as to have a thickness of 100 nanometers, and is then etched through photolithography and RIE with $Cl_2$ gas.

Figure 7:
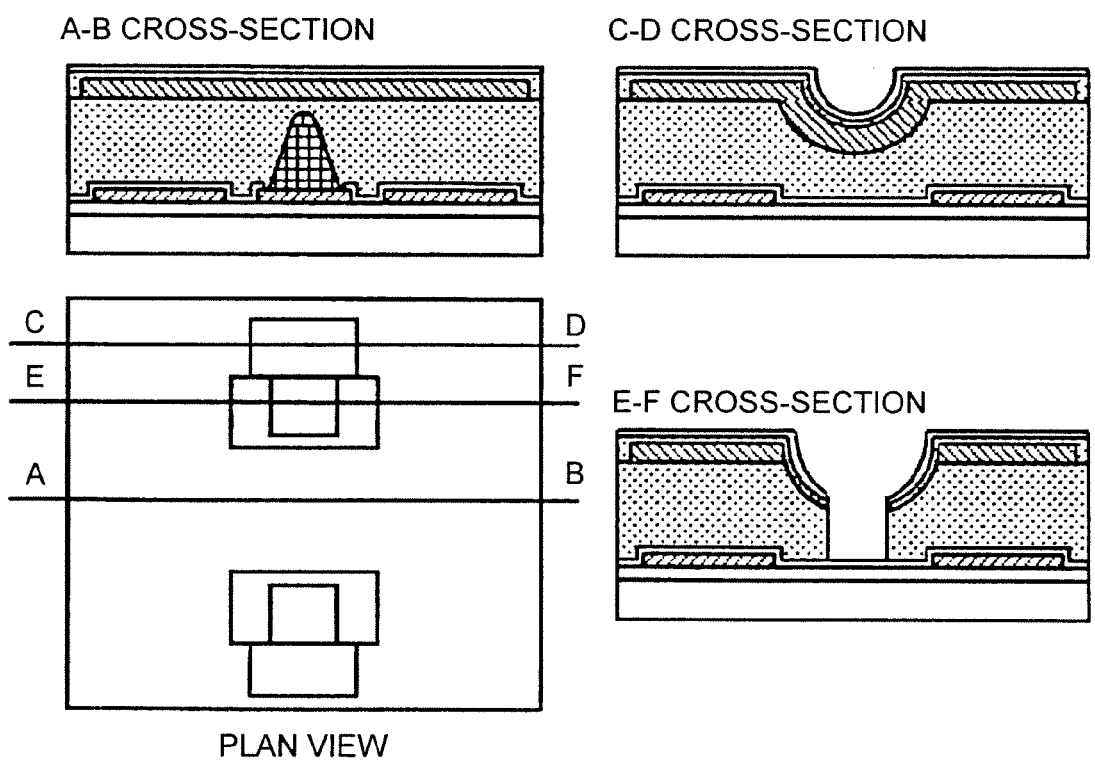
FIG. 7 is a drawing for explaining continuation of the manufacturing method shown in FIG. 6.

Step f: As depicted in FIG. 7, a photoresist is applied through spraying so as to have a thickness of 200 nanometers (film formation through organic film vapor deposition is also possible). Through plasma CVD with mixed gas of $SiH_4$ and $N_2O$, an Si oxide film is formed so as to have a thickness of 100 nanometers. Through photolithography and RIE with mixed gas of $CF_4$ and $H_2$, the Si oxide film is then opened. Through RIE with $O_2$, the photoresist is then etched.

Figure 8:
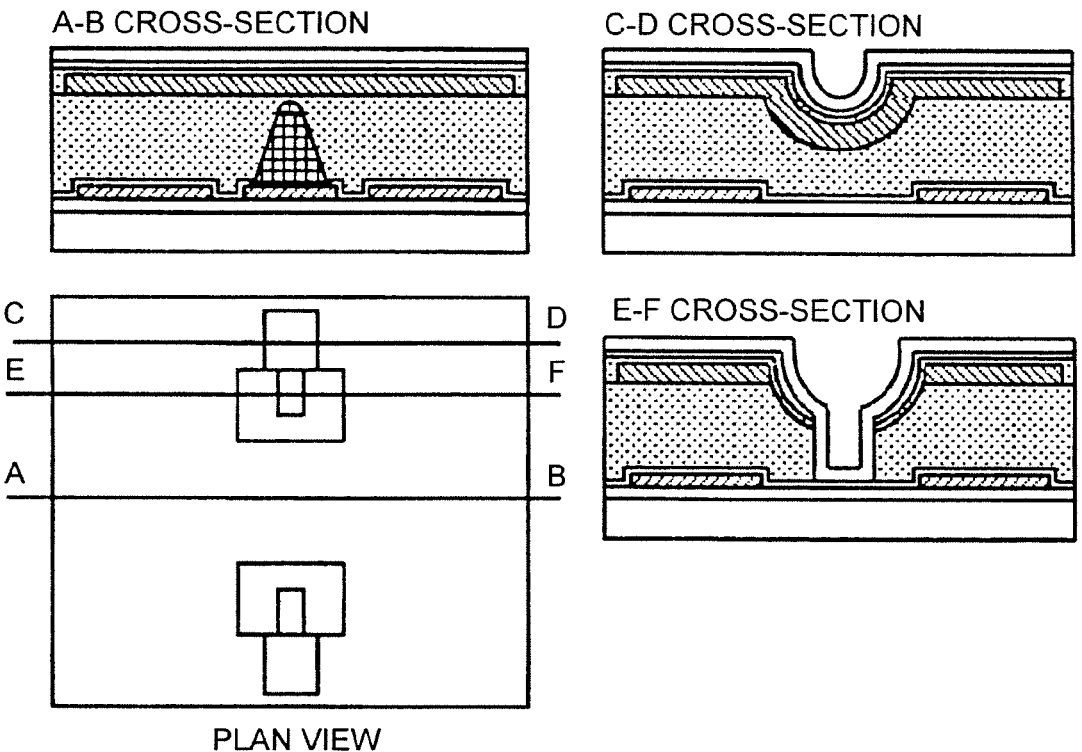
FIG. 8 is a drawing for explaining continuation of the manufacturing method shown in FIG. 7.

Step g: As depicted in FIG. 8, through plasma CVD with mixed gas of $SiH_4$ and $N_2O$, an Si oxide film is formed so as to have a thickness of 300 nanometers.

Figure 9:
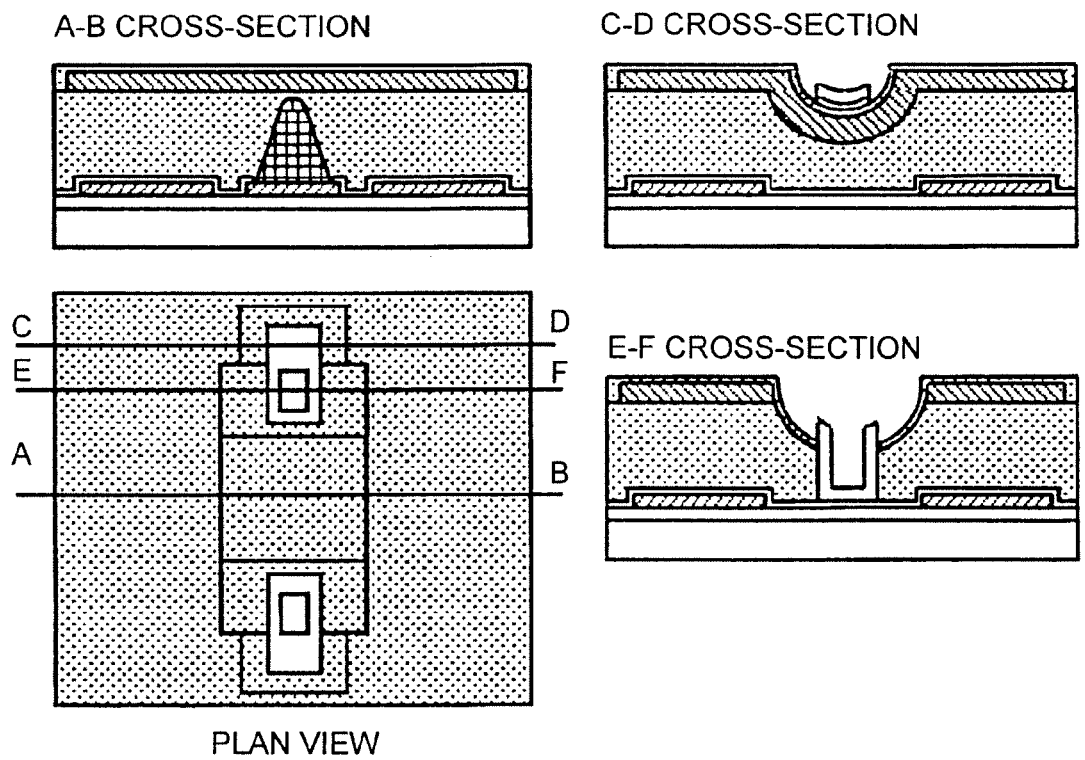
FIG. 9 is a drawing for explaining continuation of the manufacturing method shown in FIG. 8.

Step h: As depicted in FIG. 9, etching is performed through photolithography and RIE with mixed gas of $Cf_4$ and $H_2$.

Figure 10:
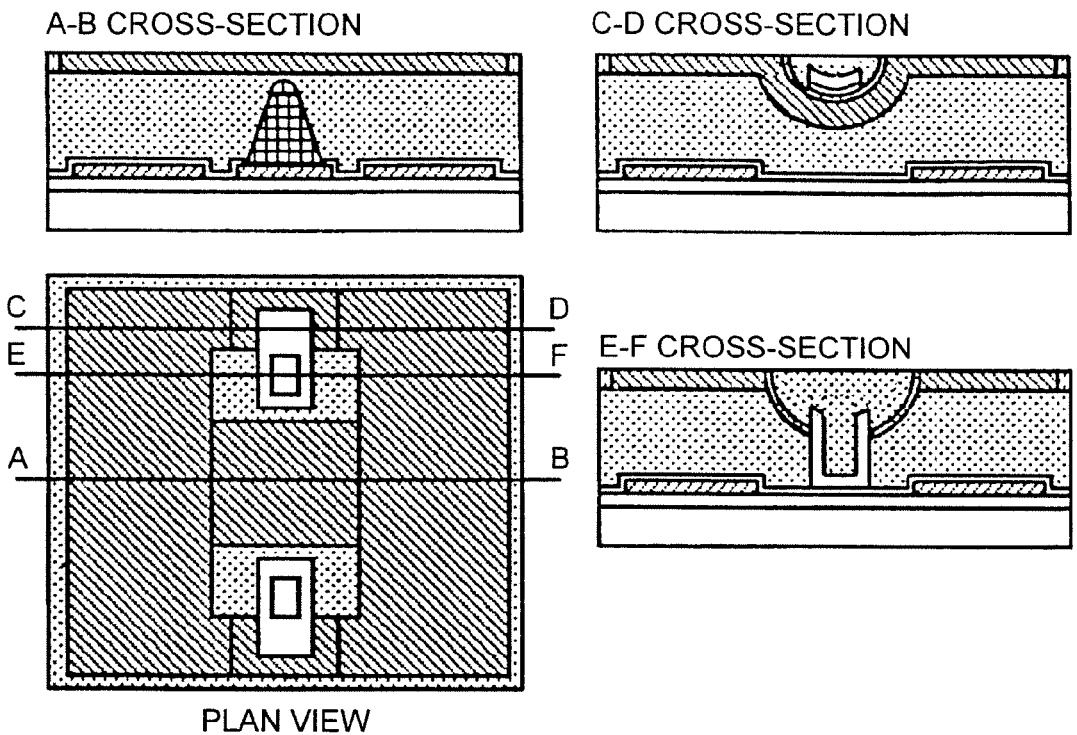
FIG. 10 is a drawing for explaining continuation of the manufacturing method shown in FIG. 9.

Step i: As depicted in FIG. 10, a photoresist is applied, and is then planarized through CMP.

Figure 11:
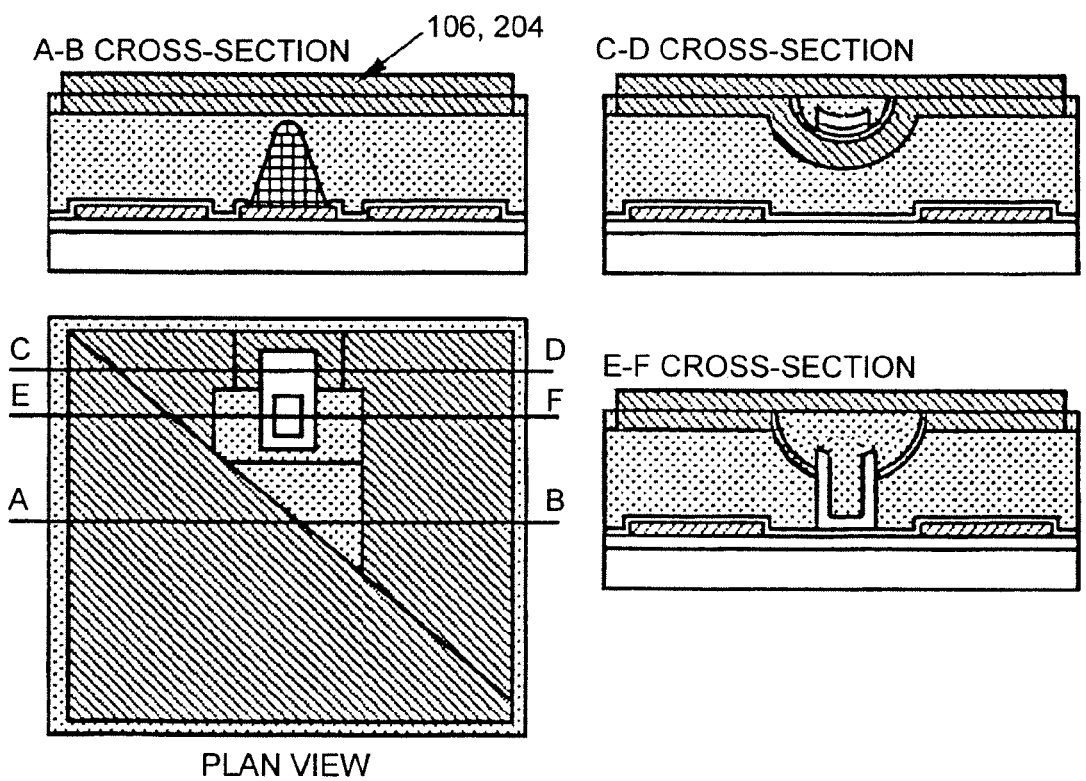
FIG. 11 is a drawing for explaining continuation of the manufacturing method shown in FIG. 10.
Figure 12:
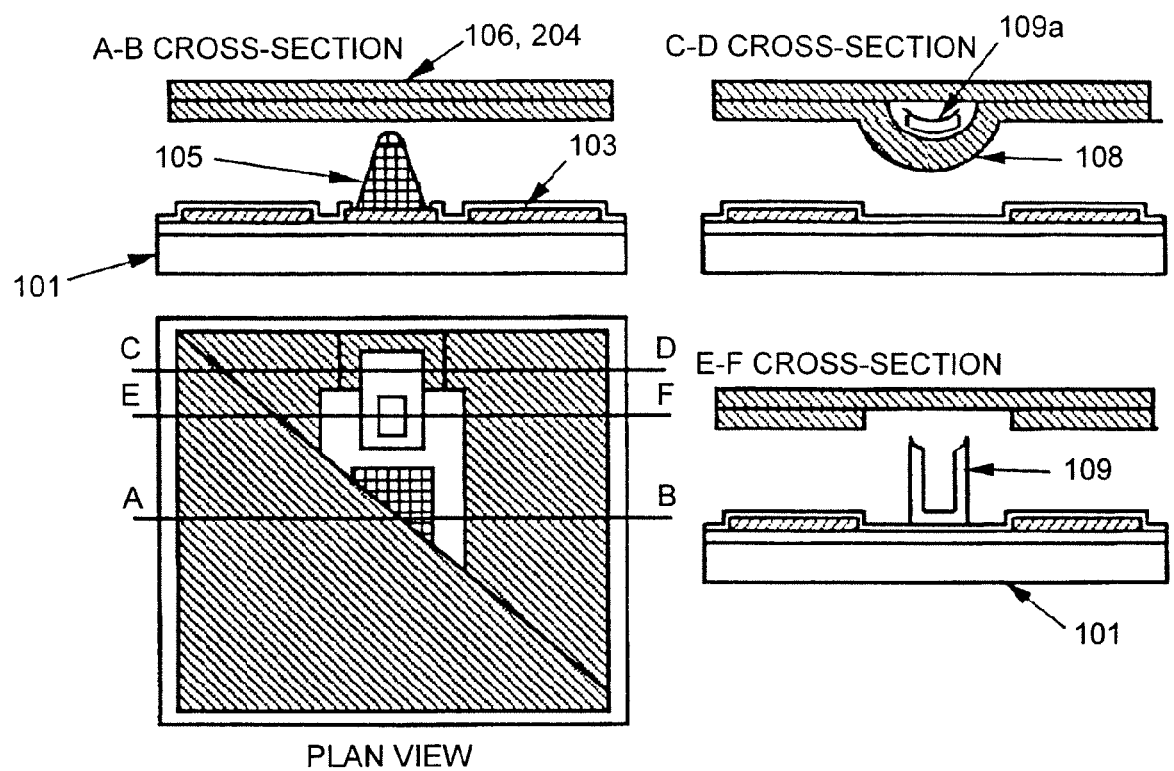
FIG. 12 is a drawing for explaining continuation of the manufacturing method shown in FIG. 11.

Step j: As depicted in FIG. 11, a metal film 204, such as Al or Al—Ti alloy, for example, serving as the upper layer of the plate-shaped member 106 is formed so as to have a thickness of 100 nanometers, and is then etched through photolithography and RIE with $Cl_2$ gas. In a plan view included in FIG. 11, the plate-shaped member 106 covers the entire surface, and therefore part of device is omitted.

Step k: Isotropic etching is performed with $O_2$ plasma and the sacrifice layer of the novolac photoresist is removed, thereby completing an optical deflecting device. In a plan view included in FIG. 12, the plate-shaped member 106 covers the entire surface, and therefore part of device is omitted.

FIGS. 13A to 13D are drawings of the structure of an optical deflecting device according to the present embodiment. FIGS. 14A, 14B, and 15 to 23 are drawings for explaining an optical deflecting device manufacturing method according to the present embodiment.

Figure 13A:
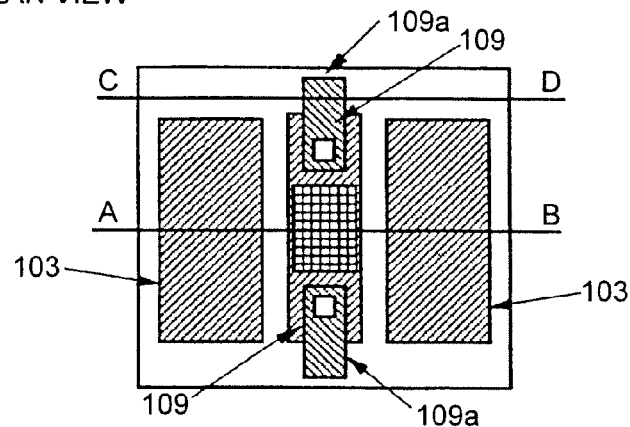
FIGS. 13A to 13D are drawings of the structure of an optical deflecting device according to a second embodiment of the present invention.
Figure 13B:
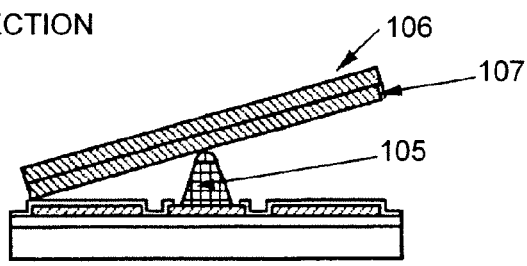
Figure 13C:
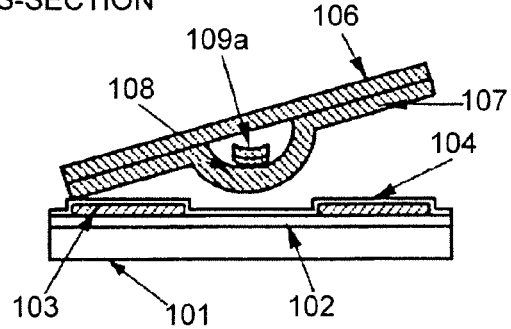
Figure 13D:
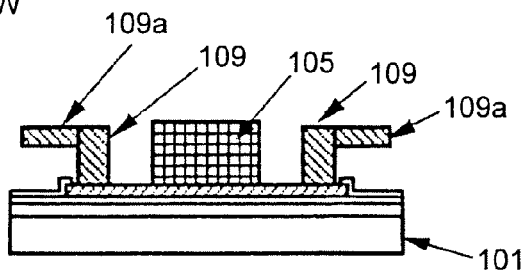

FIG. 13A is a schematic plan view of the optical deflecting device (a plate-shaped member acting as a movable mirror is omitted). FIG. 13B is an A-B schematic cross-section view. FIG. 13C is a C-D schematic cross-section view. FIG. 13D is a schematic side view. Here, in FIG. 13A, the plate-shaped member acting as a movable mirror is omitted because it covers the entire surface. Also in FIG. 13D, the plate-shaped member is omitted.

In the optical deflecting device according to the present embodiment, the regulating members 109 and the stoppers 109a are conductors. Other than that, the second embodiment is similar to the first embodiment.

Next, a typical process of manufacturing an optical deflecting device explained above is explained. Here, it is assumed that the size of the plate-shaped member 106 measures 10 micrometers per side and its tilt angle is 10 degrees.

Figure 14A:
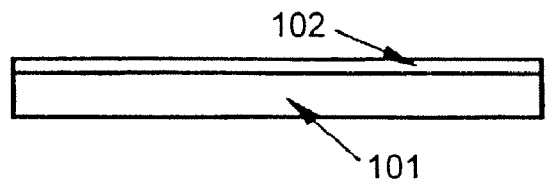
FIGS. 14A and 14B are drawings for explaining an optical deflecting device manufacturing method according to the second embodiment.

Step a: As depicted in FIG. 14A, on a silicon wafer serving as the silicon substrate 101, the insulating film 102 is formed.

Figure 14B:
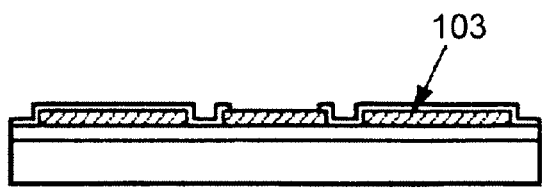

Step b: As depicted in FIG. 14B, an Al film serving as the group of electrodes 103 is formed through spattering so as to have a thickness of 200 nanometers, and is then patterned through photolithography by using an organic resist. Then, etching is performed through RIE with $Cl_2$ gas to form electrodes. Through a plasma CVD with mixed gas of $SiH_4$ and $N_2O$, an oxide film, which is the protective insulating film 104, is formed so as to have a thickness of 250 nanometers.

Figure 15:
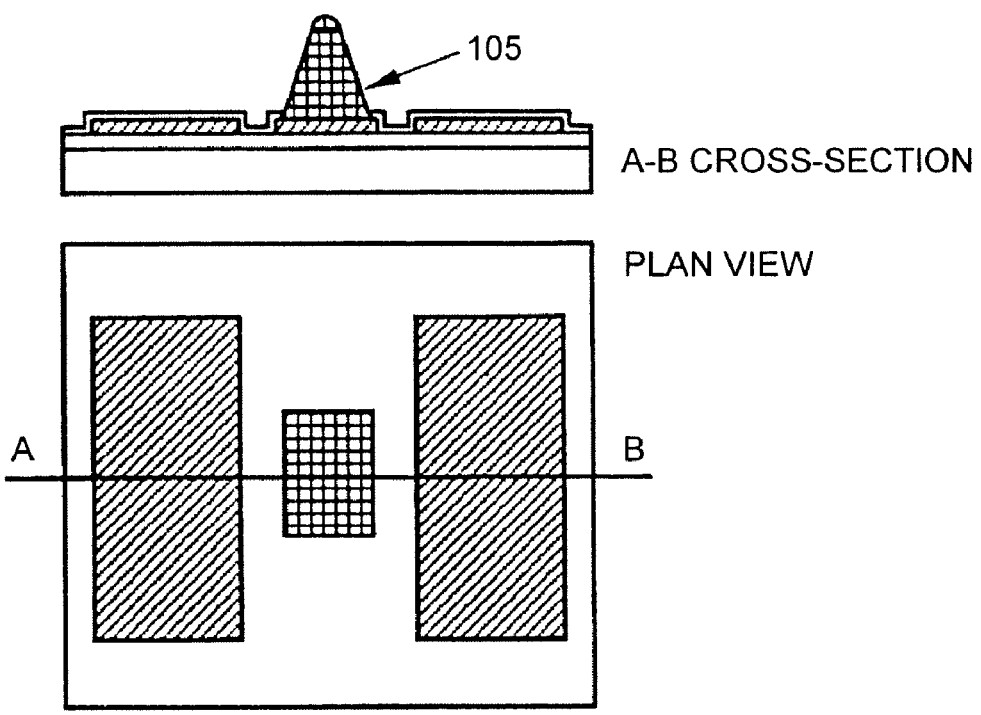
FIG. 15 is a drawing for explaining continuation of the manufacturing method shown in FIG. 14B.

Step c: As depicted in FIG. 15, the protective insulating film 104 is etched through photolithography and RIE with mixed gas of $CF_4$ and $H_2$ to open the insulating film. A tungsten W film is then formed so as to have a thickness of 1 micrometer and, by using a photomask with gradation, the pivot member 105 is formed through photolithography so as to have a height of 0.87 micrometers.

Figure 16:
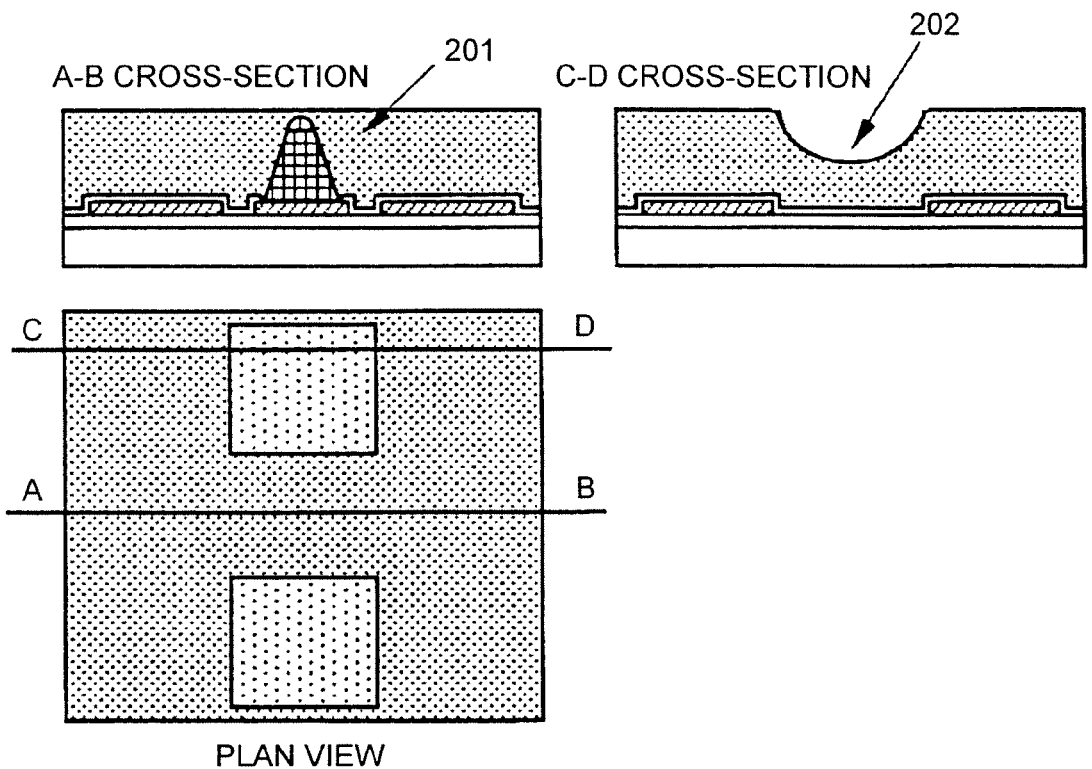
FIG. 16 is a drawing for explaining continuation of the manufacturing method shown in FIG. 15.

Step d: As depicted in FIG. 16, a novolac photoresist serving as the sacrifice layer 201 is applied, and is then planarized through Chemical Mechanical Polishing (CMP). By using the photomask with gradation, the concave surface 202 is formed from the photoresist so as to have an arc-shaped cross-section. This concave surface 202 serves as a basic pattern of the loop shape of the bearing portions 108 formed on the lower layer 107 of the plate-shaped member 106. At this time, the gradation of the photomask is set so that the concave surface 202 has a predetermined curvature.

Figure 17:
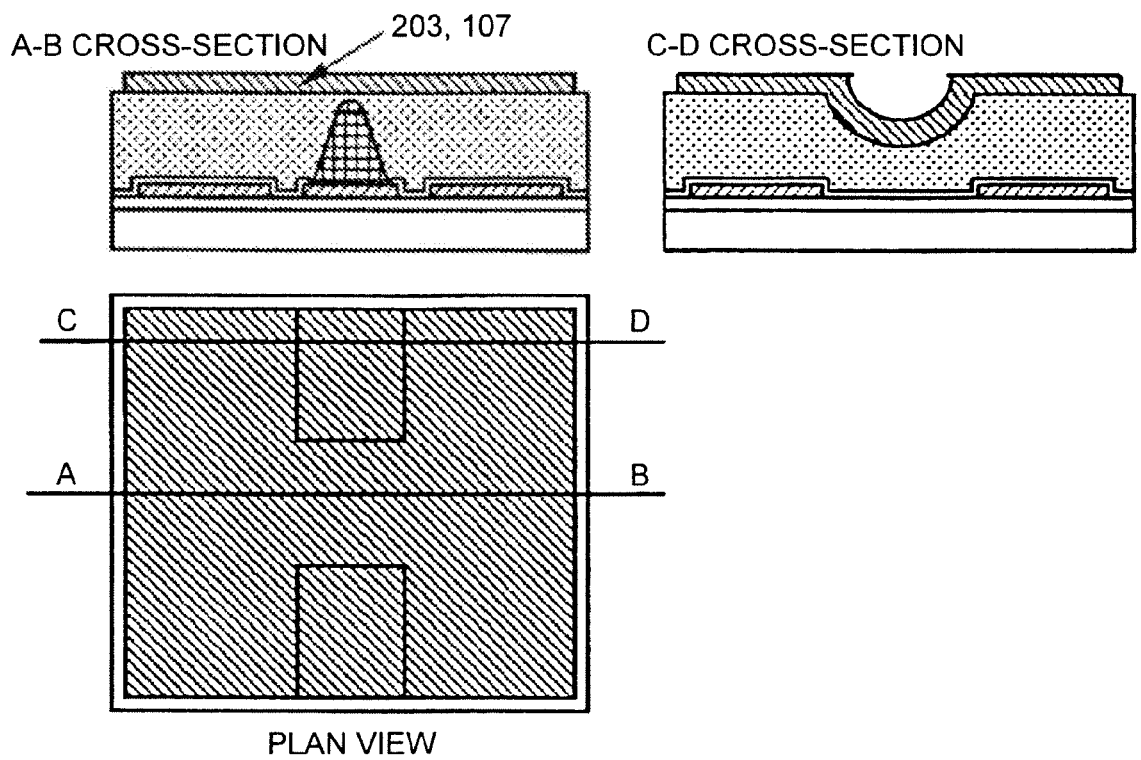
FIG. 17 is a drawing for explaining continuation of the manufacturing method shown in FIG. 16.

Step e: As depicted in FIG. 17, the metal film 203, such as Al or Al—Ti alloy, for example, serving as the lower layer 107 of the plate-shaped member 106 is formed so as to have a thickness of 100 nanometers, and is then etched through photolithography and RIE with $Cl_2$ gas.

Figure 18:
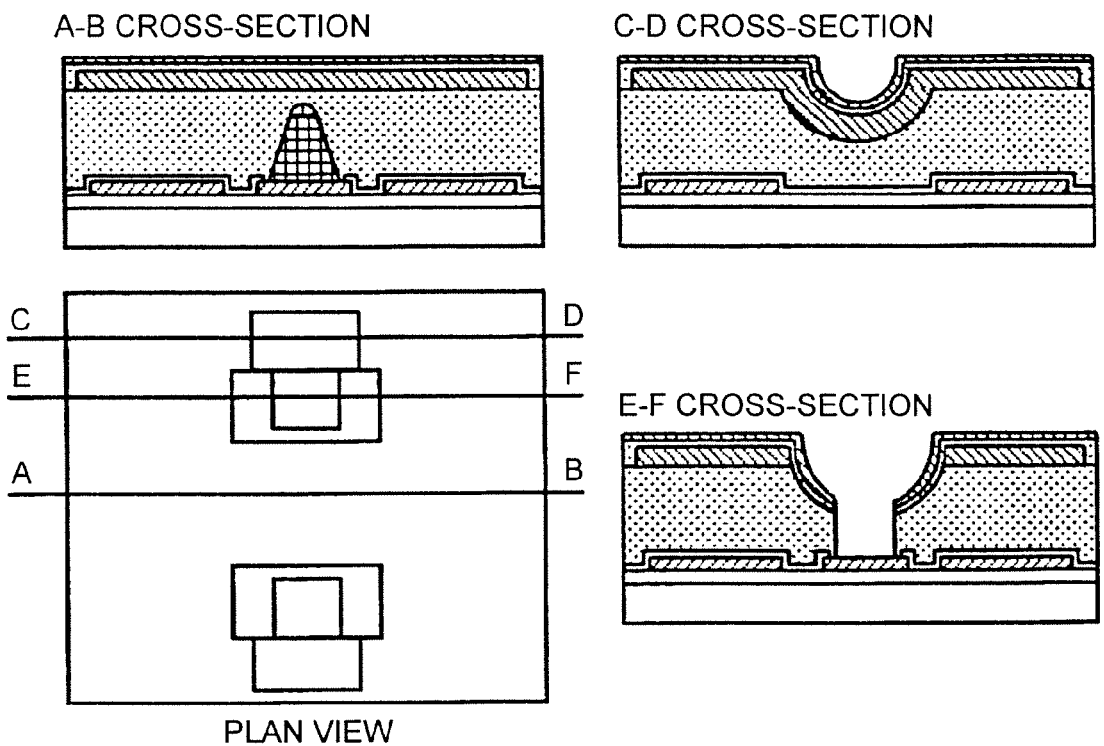
FIG. 18 is a drawing for explaining continuation of the manufacturing method shown in FIG. 17.

Step f: As depicted in FIG. 18, a photoresist is applied through spraying so as to have a thickness of 200 nanometers (film formation through organic film vapor deposition is also possible). Through spattering, an Al or Al—Ti alloy film is formed so as to have a thickness of 100 nanometers. Through photolithography and RIE with $Cl_2$, the metal film is then opened. Through RIE with $O_2$, the photoresist is then etched.

Figure 19:
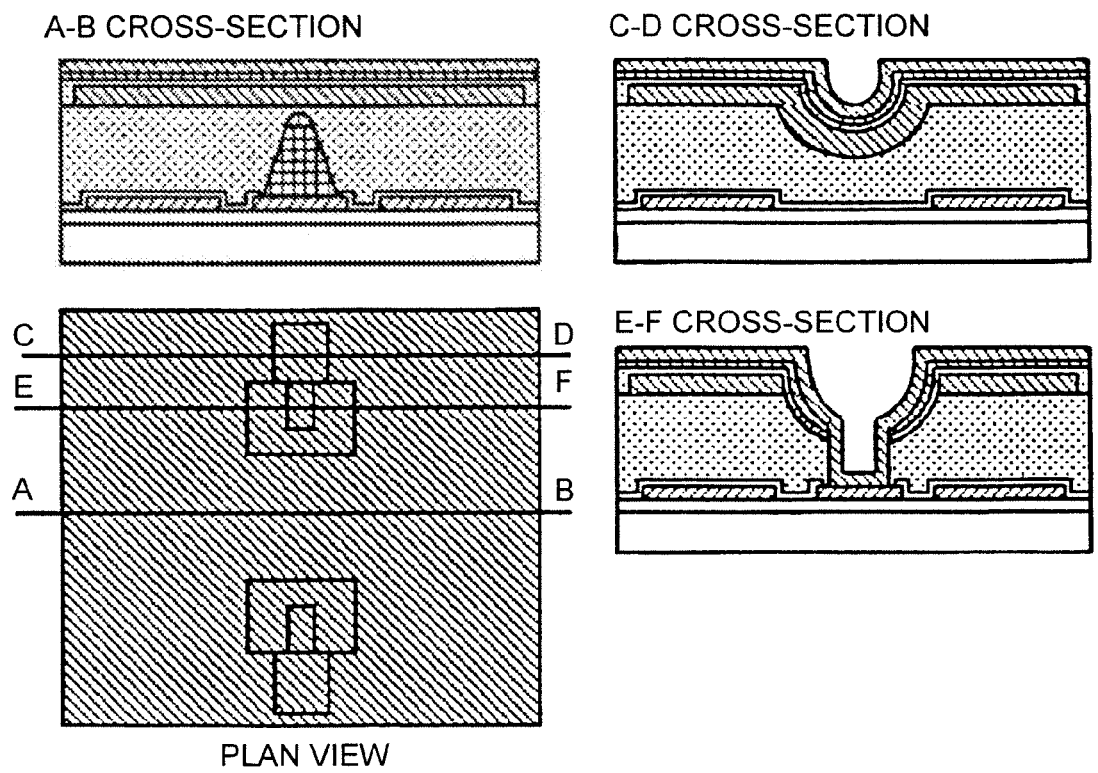
FIG. 19 is a drawing for explaining continuation of the manufacturing method shown in FIG. 18.

Step g: As depicted in FIG. 19, through spattering, an Al or Al—Ti alloy film is formed so as to have a thickness of 300 nanometers.

Figure 20:
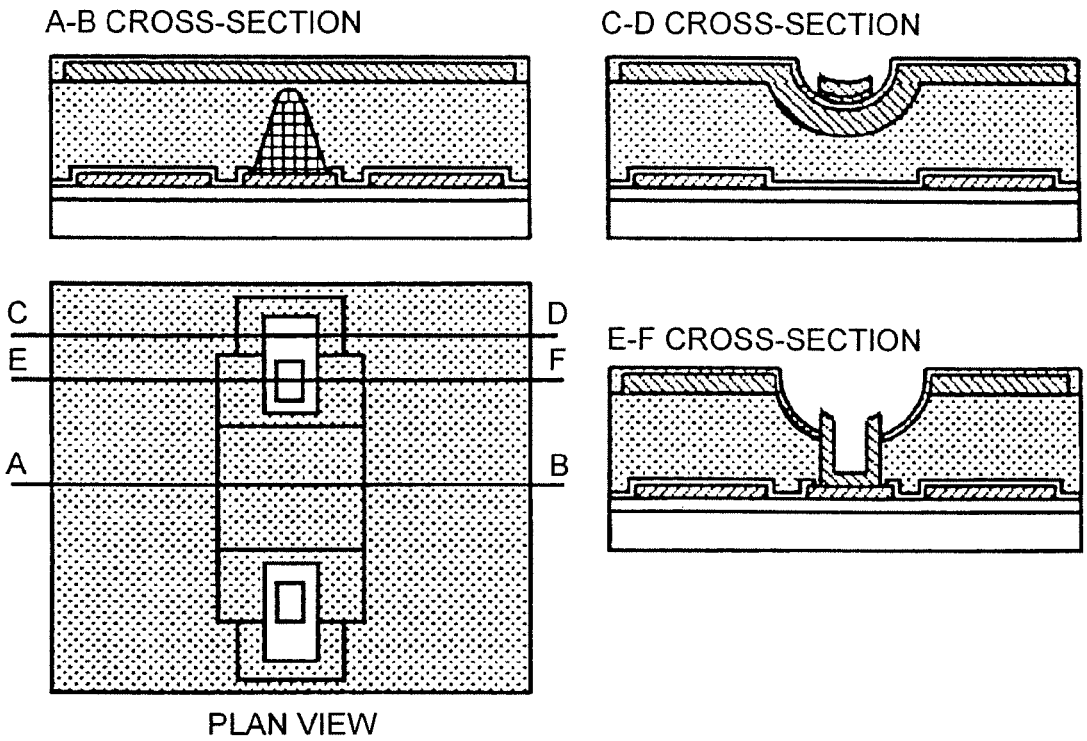
FIG. 20 is a drawing for explaining continuation of the manufacturing method shown in FIG. 19.

Step h: As depicted in FIG. 20, etching is performed through photolithography and RIE with $Cl_2$.

Figure 21:
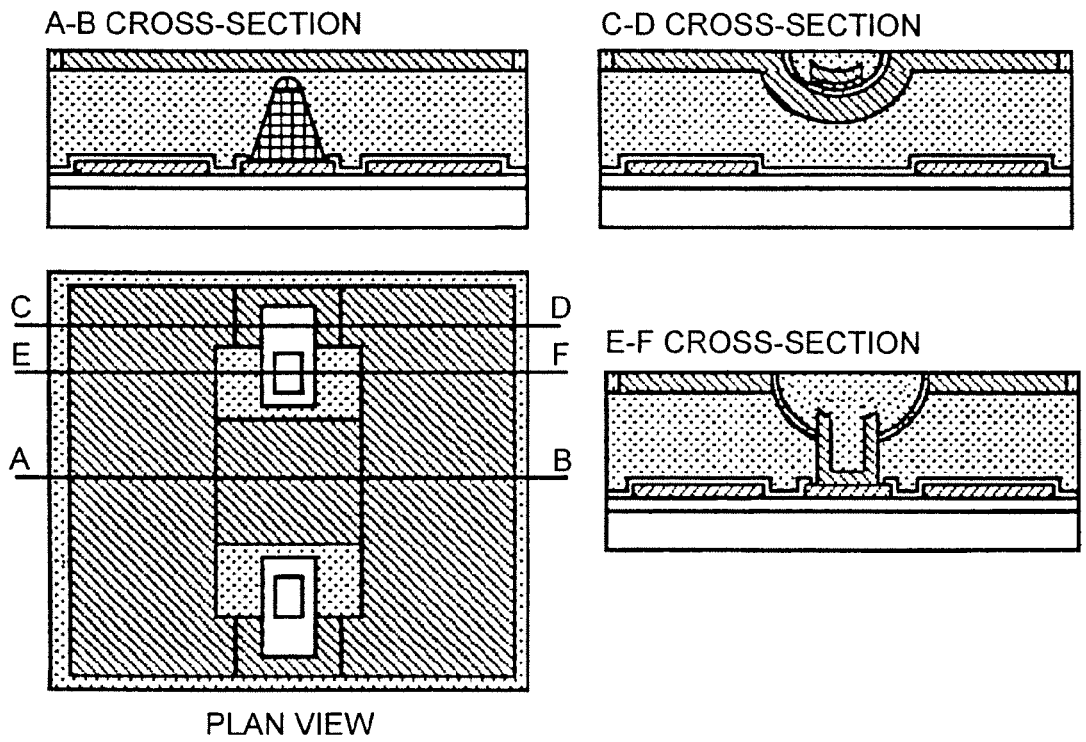
FIG. 21 is a drawing for explaining continuation of the manufacturing method shown in FIG. 20.

Step i: As depicted in FIG. 21, a photoresist is applied, and is then planarized through CMP.

Figure 22:
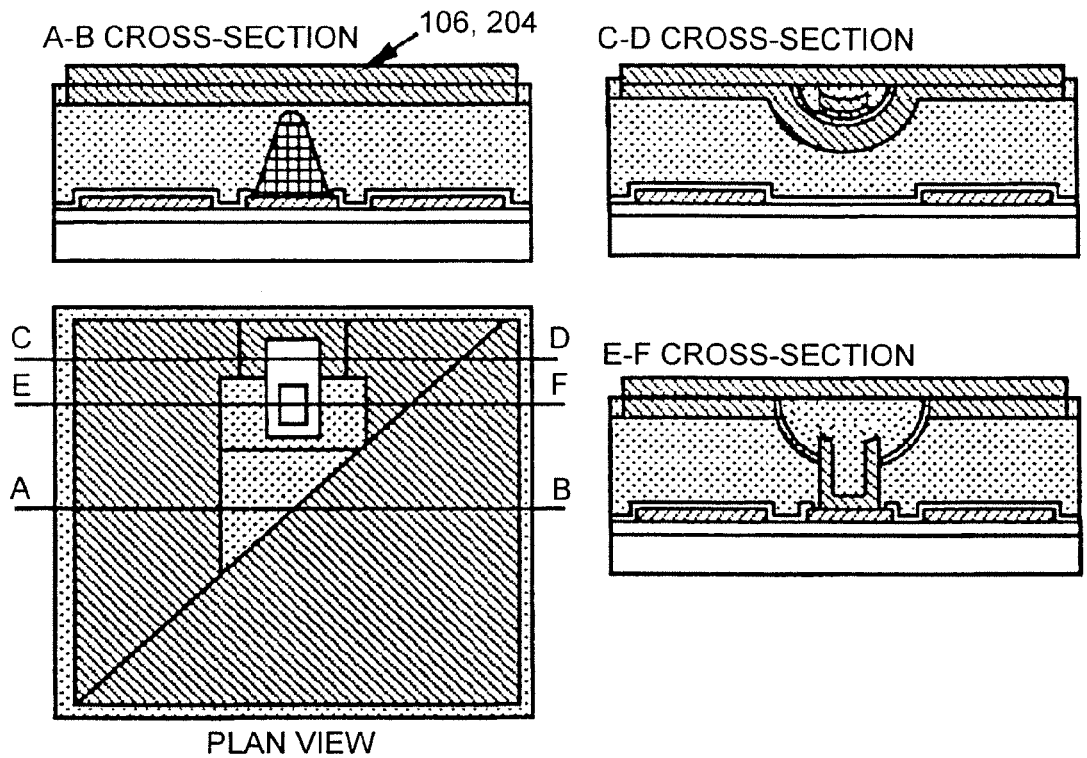
FIG. 22 is a drawing for explaining continuation of the manufacturing method shown in FIG. 21.

Step j: As depicted in FIG. 22, the metal film 204, such as Al or Al—Ti alloy, for example, serving as the upper layer (light reflecting layer) of the plate-shaped member 106 is formed so as to have a thickness of 100 nanometers, and is then etched through photolithography and RIE with $Cl_2$. In a plan view included in FIG. 22, the plate-shaped member 106 covers the entire surface, and therefore part of device is omitted.

Figure 23:
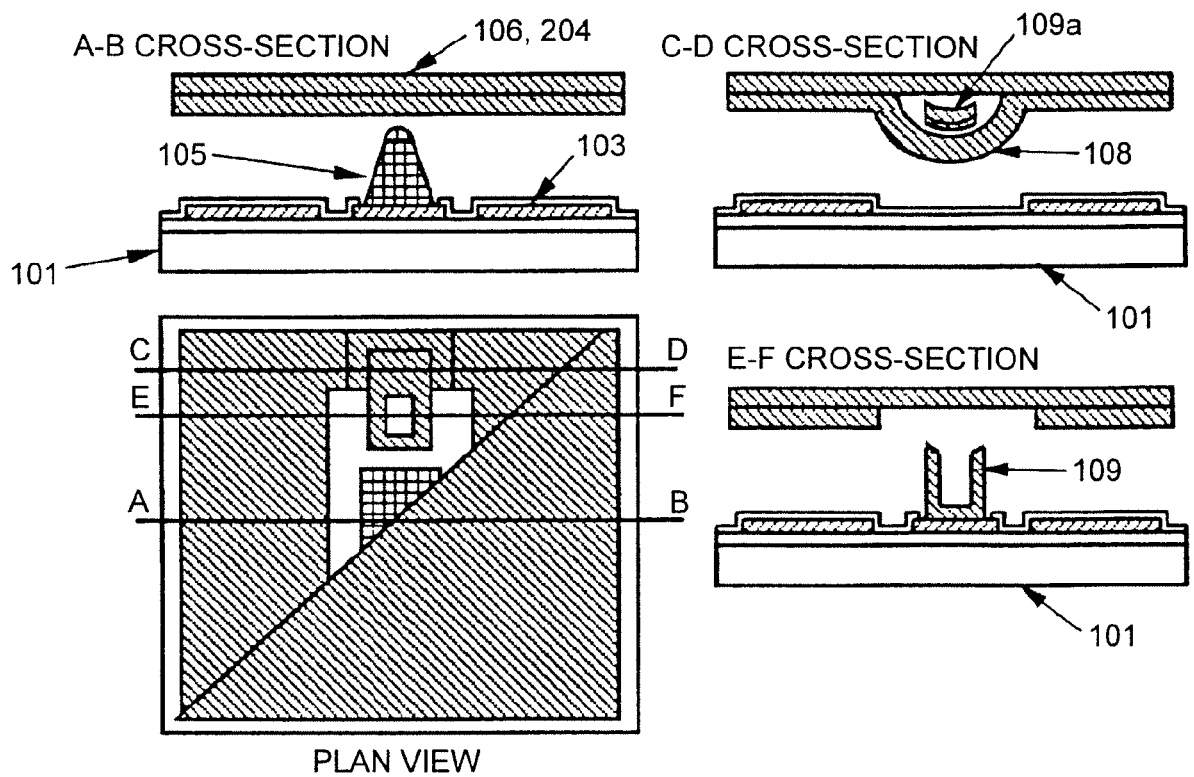
FIG. 23 is a drawing for explaining continuation of the manufacturing method shown in FIG. 22.

Step k: As depicted in FIG. 23, isotropic etching is performed with $O_2$ plasma and the sacrifice layer of the novolac photoresist is removed, thereby completing an optical deflecting device. In a plan view included in FIG. 23, the plate-shaped member 106 covers the entire surface, and therefore part of device is omitted.

FIGS. 24A to 24D are drawings of the structure of an optical deflecting device according to the present embodiment. FIGS. 25A, 25B, and 26 to 34 are drawings for explaining an optical deflecting device manufacturing method according to the present embodiment.

Figure 24A:
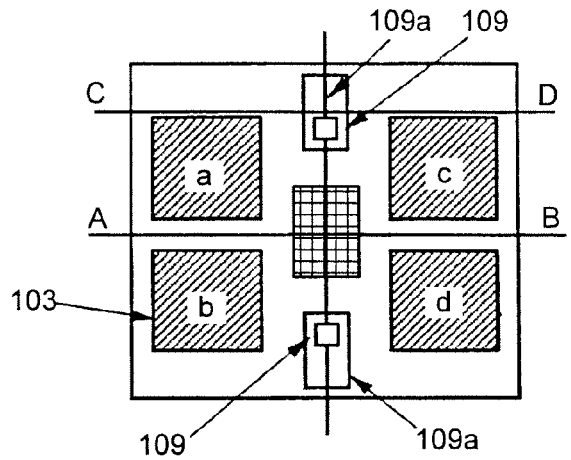
FIGS. 24A to 24D are drawings of the structure of an optical deflecting device according to a third embodiment of the present invention.
Figure 24B:
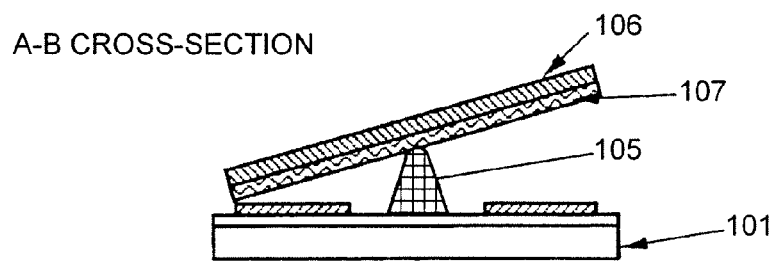
Figure 24C:
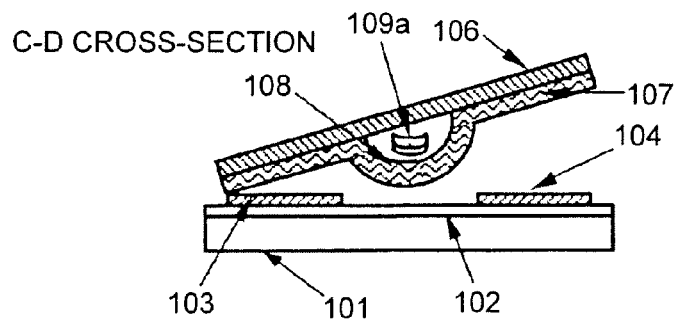
Figure 24D:
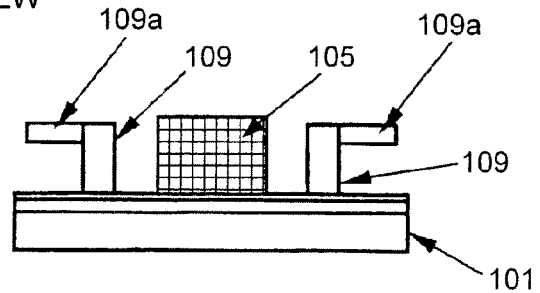

FIG. 24A is a schematic plan view of the optical deflecting device. FIG. 24B is an A-B schematic cross-section view. FIG. 24C is a C-D schematic cross-section view. FIG. 24D is a schematic side view. Here, in FIG. 24A, the plate-shaped member acting as a movable mirror is omitted because it covers the entire surface. Also in FIG. 24D, the plate-shaped member is omitted.

In the optical deflecting device according to the present embodiment, the lower layer 107 of the plate-shaped member 106 and the bearing portions 108 formed thereon are insulators. Also, as the group of electrodes 103, two electrodes "a" and "b" are formed in the first tilting direction of the plate-shaped member, whilst two electrodes "c" and "d" are formed in the second tilting direction thereof. In a driving scheme, when a voltage is applied between the electrodes "a" and "b" in the first tilting direction, an intermediate potential is induced to the plate-shaped member 106. when the intermediate potential between the electrodes "a" and "b" in the first tilting direction is provided to the electrodes "c" and "d" in the second tilting direction, there is no potential difference between the plate-shaped member 106 and the electrodes "c" and "d" in the second tilting direction, thereby preventing an electrostatic force to act. Therefore, the plate-shaped member 106 is tilted in the first direction. Here, such a induced-type driving scheme is disclosed in detail in Japanese Patent Application Laid-Open No. 2004-78136, and therefore is not explained further more.

Next, a typical process of manufacturing an optical deflecting device explained above is explained. Here, it is assumed that the size of the plate-shaped member 106 measures 10 micrometers per side and its tilt angle is 10 degrees.

Figure 25A:
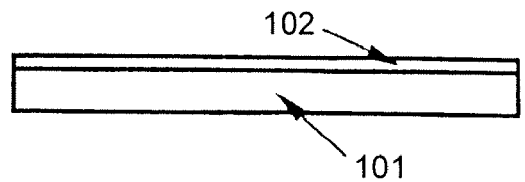
FIGS. 25A and 25B are drawings for explaining an optical deflecting device according to the third embodiment.

Step a: As depicted in FIG. 25A, on a silicon wafer serving as the silicon substrate 101, the insulating film 102 is formed.

Figure 25B:
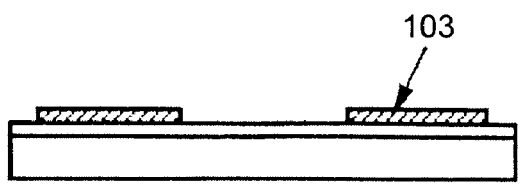

Step b: As depicted in FIG. 25B, an Al film serving as the group of electrodes 103 is formed through spattering so as to have a thickness of 200 nanometers, and is then patterned through photolithography by using an organic resist. Then, etching is performed through RIE with $Cl_2$ gas to form electrodes. Since a dielectric voltage can be ensured on the lower layer 107 of the plate-shaped member 106, the protective insulating film 104 of the first and second embodiments can be omitted.

Figure 26:
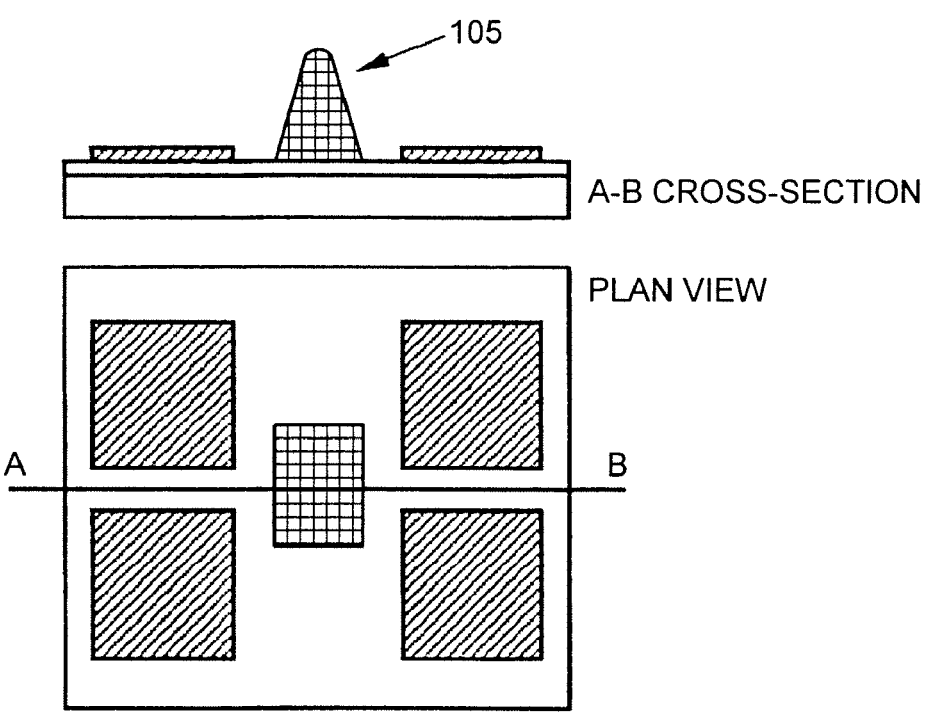
FIG. 26 is a drawing for explaining continuation of the manufacturing method shown in FIG. 25B.

Step c: As depicted in FIG. 26, the insulating film 102 is etched through photolithography and RIE with mixed gas of $CF_4$ and $H_2$ to open the insulating film 102. A polysilicon film is then formed through CVD so as to have a thickness of 1 micrometer and, by using a photomask with gradation, the pivot member 105 is formed through photolithography so as to have a height of 0.87 micrometers.

Figure 27:
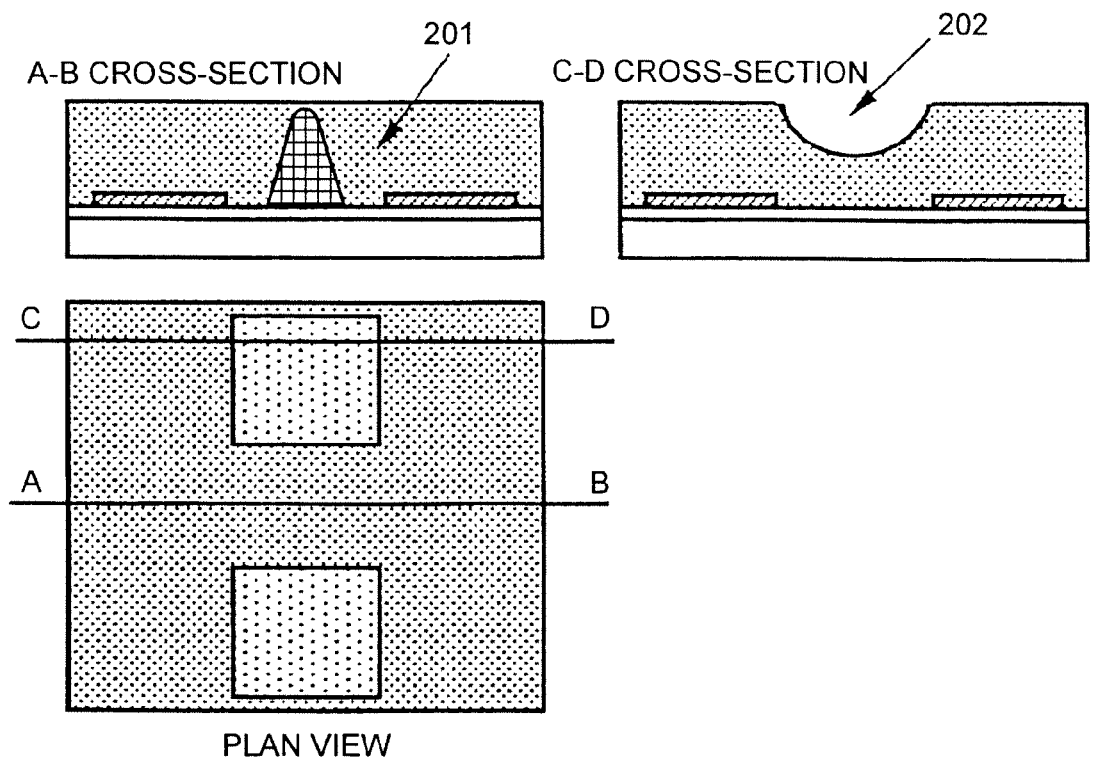
FIG. 27 is a drawing for explaining continuation of the manufacturing method shown in FIG. 26.

Step d: As depicted in FIG. 27, a novolac photoresist serving as the sacrifice layer 201 is applied, and is then planarized through Chemical Mechanical Polishing (CMP). By using the photomask with gradation, the concave surface 202 is formed from the photoresist so as to have an arc-shaped cross-section. This concave surface 202 serves as a basic pattern of the loop shape of the bearing portions 108 formed on the lower layer 107 of the plate-shaped member 106. At this time, the gradation of the photomask is set so that the concave surface 202 has a predetermined curvature.

Figure 28:
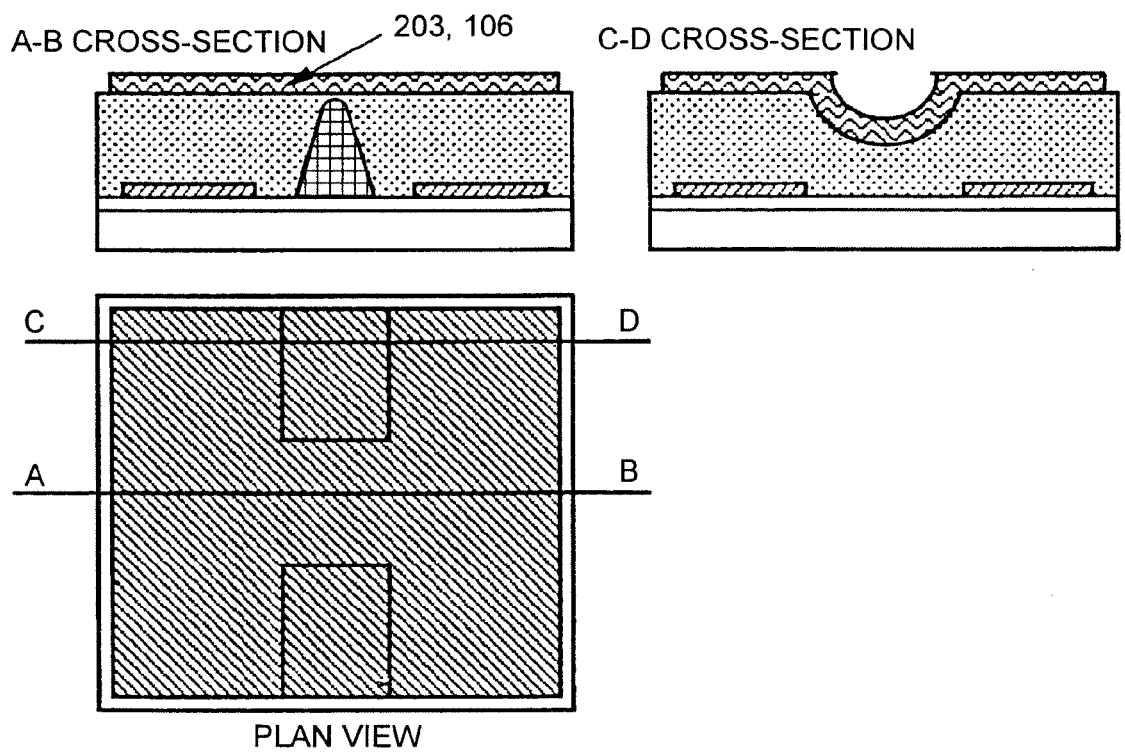
FIG. 28 is a drawing for explaining continuation of the manufacturing method shown in FIG. 27.

Step e: As depicted in FIG. 28, the metal film 203, such as a SiN (silicon nitride) film, serving as the lower layer 107 of the plate-shaped member 106 is formed through CVD, and is then etched through photolithography and RIE with mixed gas of $CHF_3$ and $H_2$.

Figure 29:
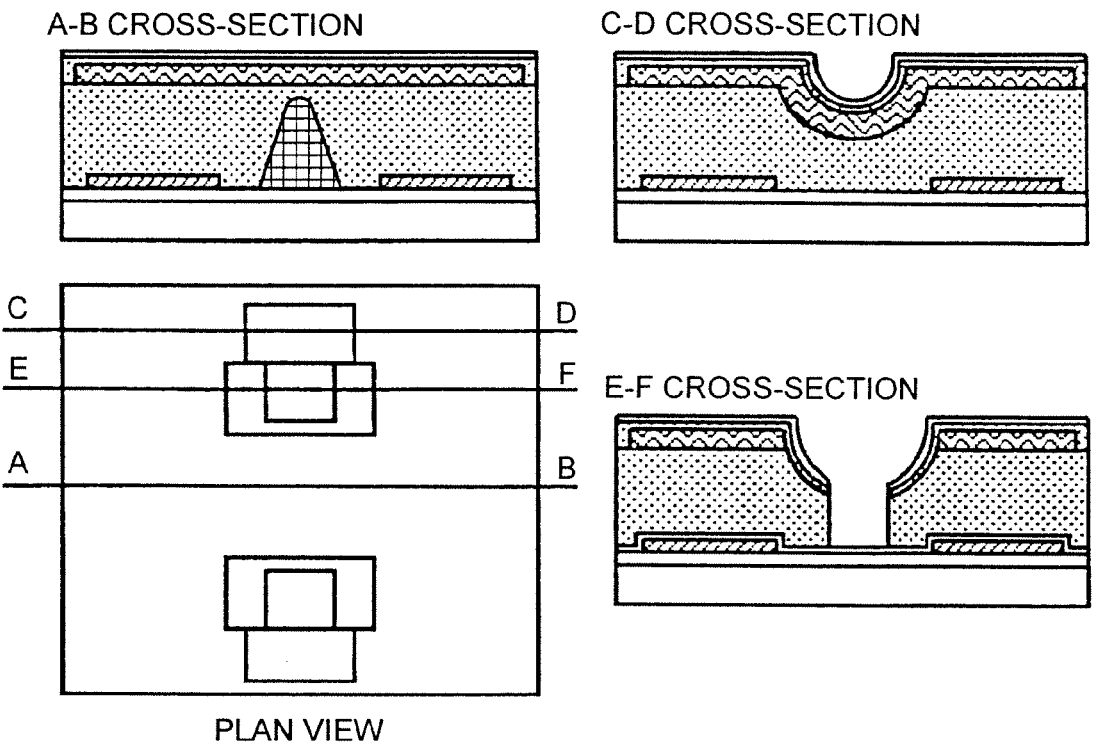
FIG. 29 is a drawing for explaining continuation of the manufacturing method shown in FIG. 28.

Step f: As depicted in FIG. 29, a photoresist is applied through spraying so as to have a thickness of 200 nanometers (film formation through organic film vapor deposition is also possible). Through plasma CVD with mixed gas of $SiH_4$ and $N_2O$, a Si oxide film is formed so as to have a thickness of 100 nanometers. Through photolithography and RIE with $CF_4$ and $H_2$, the Si oxide film is then opened. Through RIE with $O_2$, the photoresist is then etched.

Figure 30:
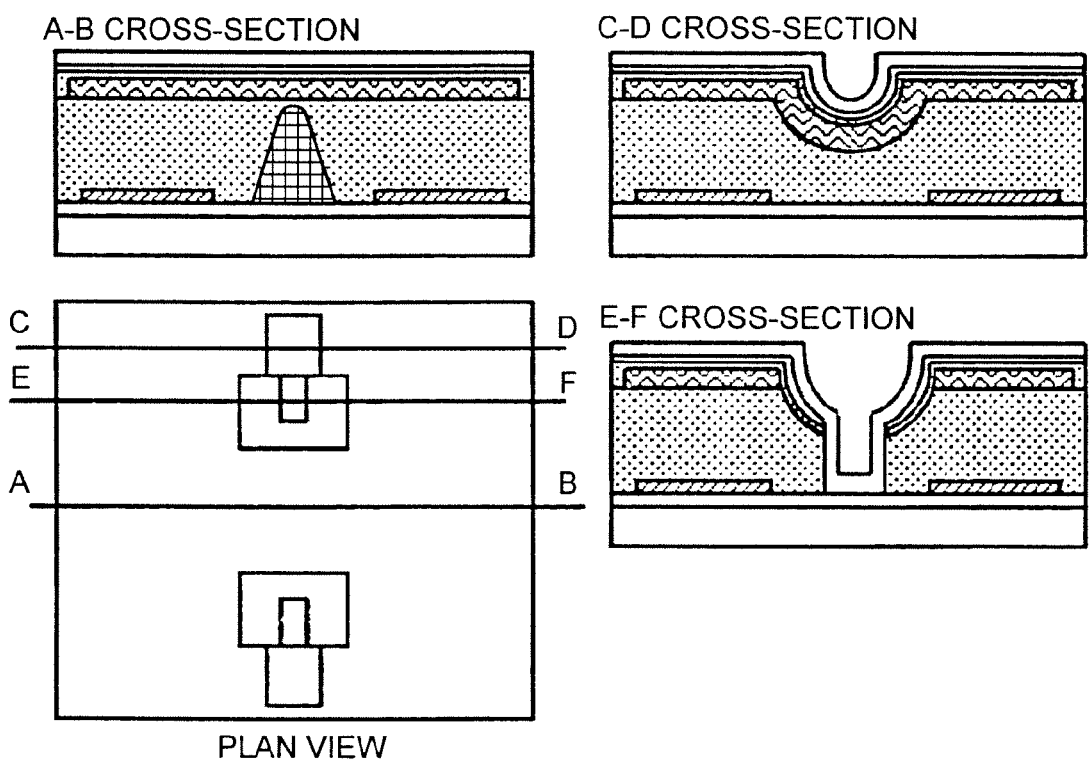
FIG. 30 is a drawing for explaining continuation of the manufacturing method shown in FIG. 29.

Step g: As depicted in FIG. 30, through plasma CVD with mixed gas of $SiH_4$ and $N_2O$, a Si oxide film is formed so as to have a thickness of 300 nanometers.

Figure 31:
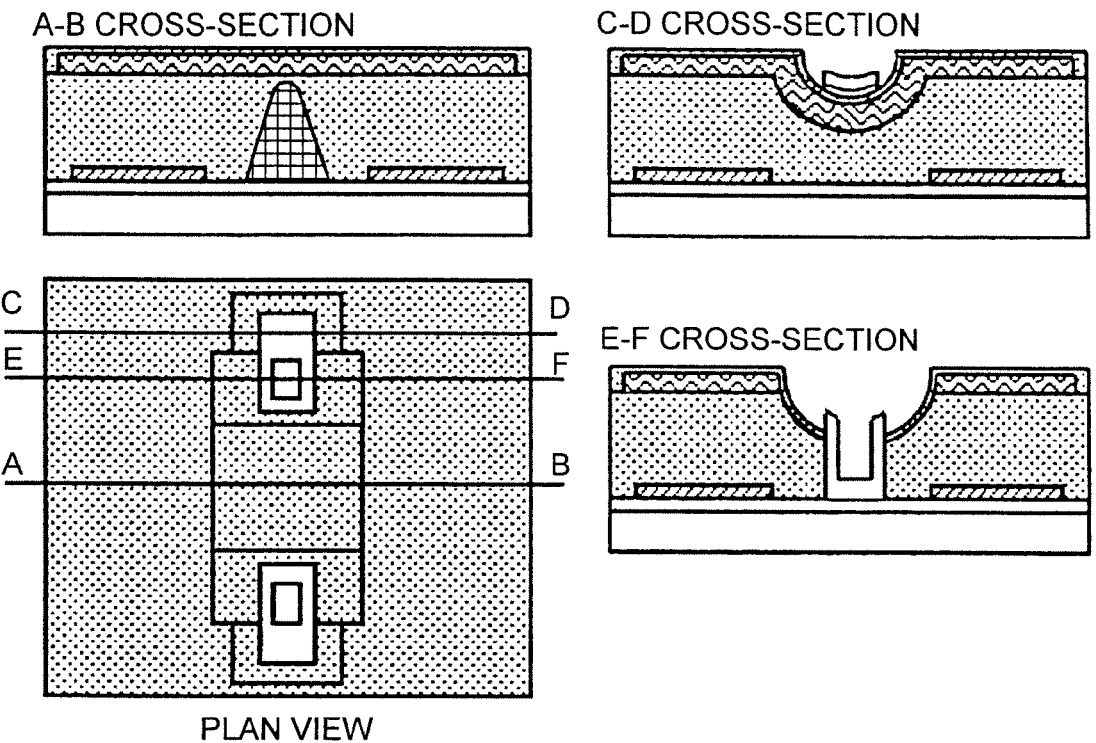
FIG. 31 is a drawing for explaining continuation of the manufacturing method shown in FIG. 30.

Step h: As depicted in FIG. 31, the insulating film is etched through photolithography and RIE with mixed gas of $Cf_4$ and $H_2$.

Figure 32:
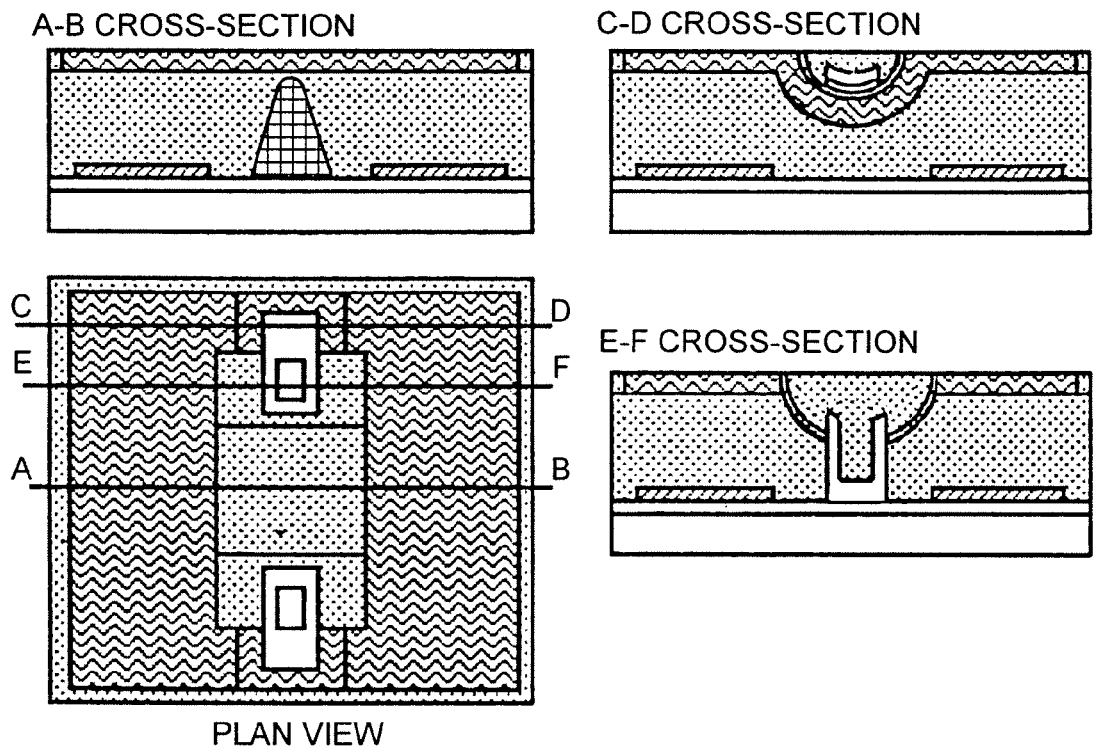
FIG. 32 is a drawing for explaining continuation of the manufacturing method shown in FIG. 31.

Step i: As depicted in FIG. 32, a photoresist is applied, and is then planarized through CMP.

Figure 33:
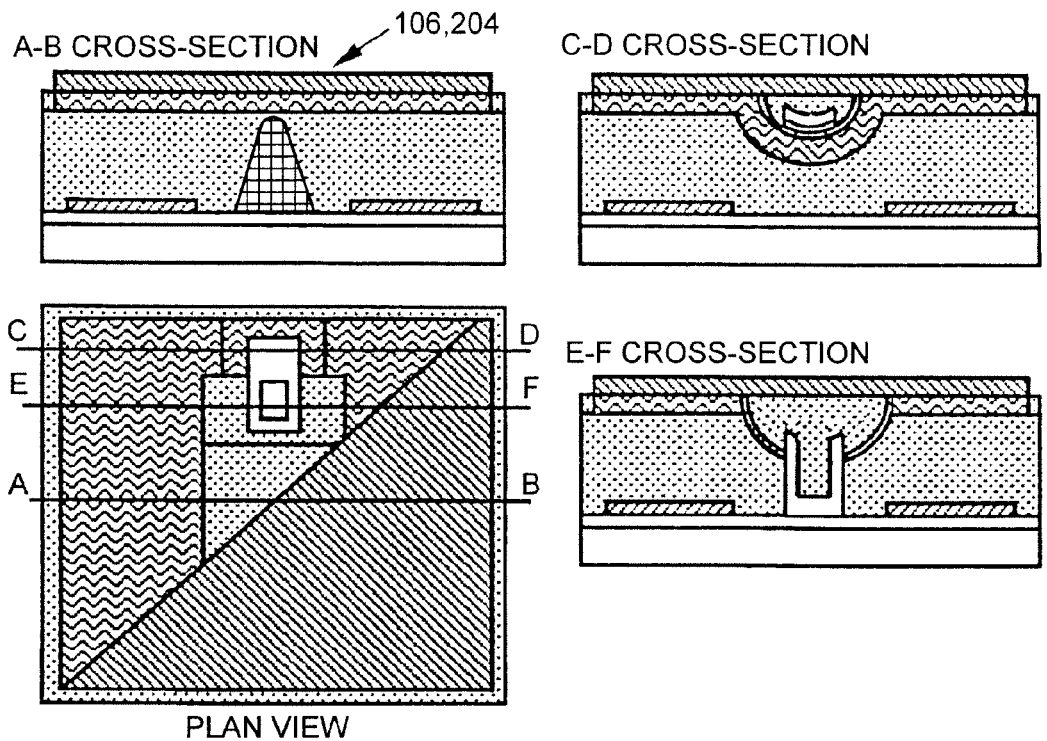
FIG. 33 is a drawing for explaining continuation of the manufacturing method shown in FIG. 32.

Step j: As depicted in FIG. 33, the metal film 204, such as Al or Al—Ti alloy, for example, serving as the upper layer (light reflecting layer) of the plate-shaped member 106 is formed, and is then etched through photolithography and RIE with $Cl_2$. In a plan view included in FIG. 33, the plate-shaped member 106 covers the entire surface, and therefore part of device is omitted.

Figure 34:
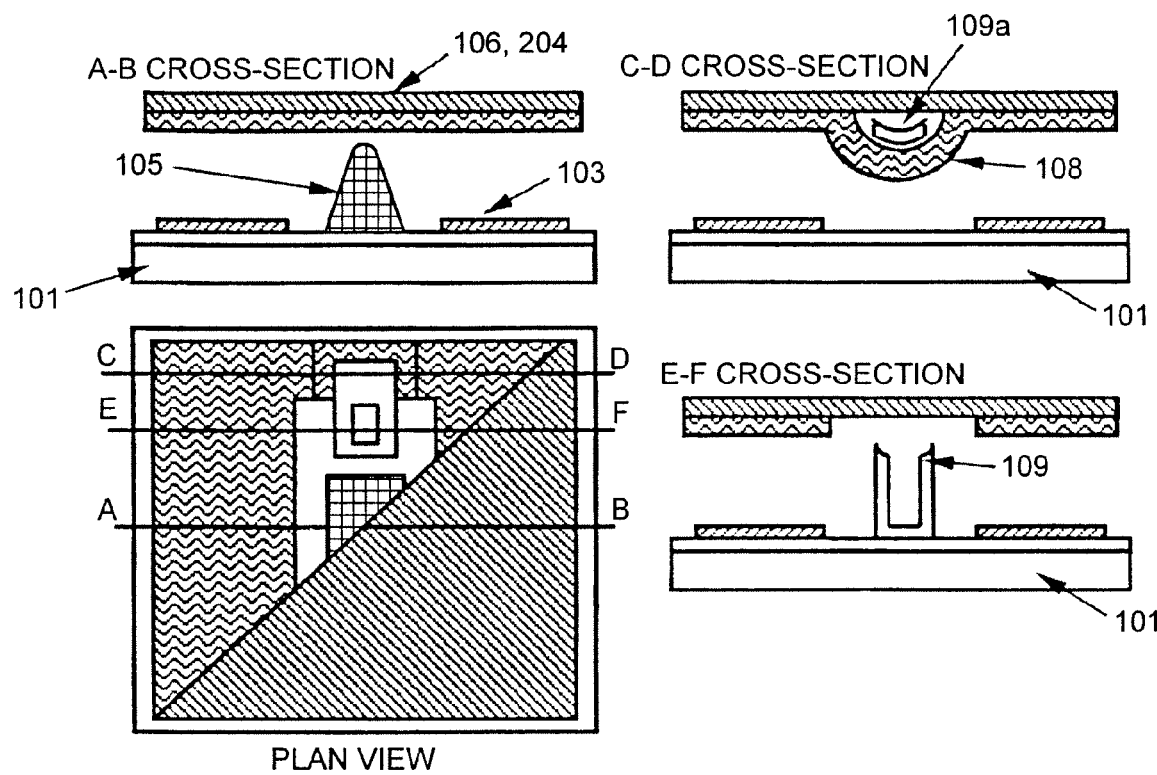
FIG. 34 is a drawing for explaining continuation of the manufacturing method shown in FIG. 33.

Step k: As depicted in FIG. 34, isotropic etching is performed with $O_2$ plasma and the sacrifice layer of the novolac photoresist is removed, thereby completing an optical deflecting device. In a plan view included in FIG. 34, the plate-shaped member 106 covers the entire surface, and therefore part of device is omitted.

Figure 35:
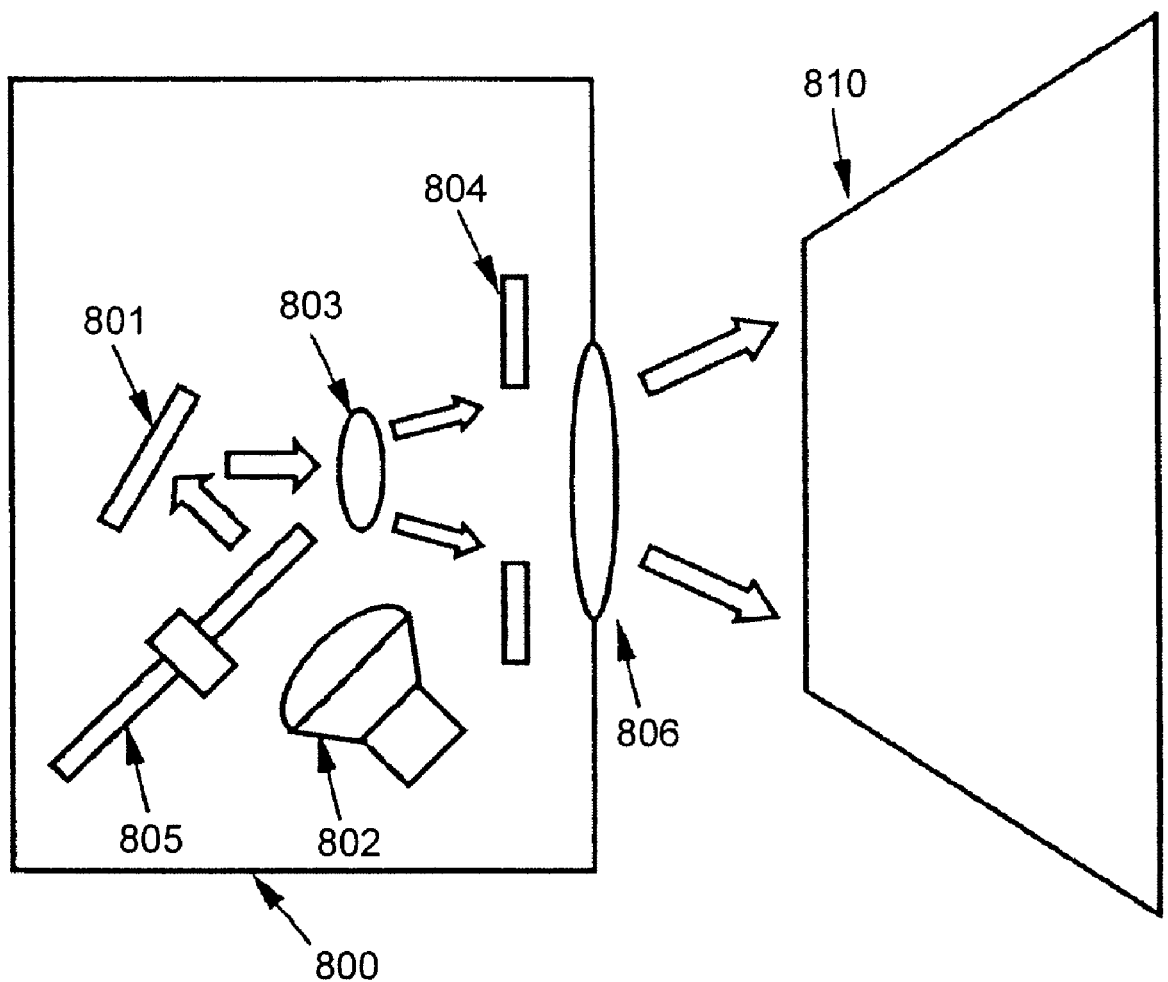
FIG. 35 is a schematic drawing of an optical projecting device according to a fourth embodiment of the present invention.

FIG. 35 depicts the structure of an optical projecting device 800 using the optical deflecting device explained above. In FIG. 35, with light having an angle of divergence emitted from a light source 802, an optical deflecting device 801 (or its two-dimensional array) according to the present invention is radiated through, for example, a rotational color filer 805. Reflected light from a light reflecting surface of a plate-shaped member of the optical deflecting device 801 is projected through projection lenses 803 and 806 forming an optical system together with a light shielding unit 804 onto a projection screen 810 when the plate-shaped member is tilted in the first tilting direction. This is an ON state. However, when the plate-shaped member of the optical deflecting device 801 is tilted in the second tilting direction, reflected light from the light reflecting surface is shielded by the light shielding unit 804 serving as a diaphragm, and cannot be projected onto the projection screen. This is an OFF state.

When the two-dimensional array of the optical deflecting device 801 is used, with this ON or OFF, an image can be formed onto the projection screen 810. The optical deflecting device 801 can be used as an optical switching unit of a display (that is, pixel light and dark display) device. Therefore, excellent light and dark control of pixels (that is, ON/OFF control of the optical switch) can be achieved. Also, stray light (reflected light from an adjacent element occurring at the time of distortion in a reflecting direction) can be suppressed. Furthermore, a high-speed operation can be achieved. Still further, high reliability can be achieved for a long time. Still further, driving can be made with low voltage. Still further, a contrast ratio can be increased.

According to an aspect of the present invention, the plate-shaped member can smoothly rotate with the apex of the pivot member as a pivot. Also, its rotation axis tends not to be shifted, thereby allowing stable rotation of the plate-shaped member. Furthermore, there is no hole or the like one the upper surface (light reflecting surface) of the plate-shaped member. Therefore, the entire upper surface of the plate-shaped member can be used as a light reflecting surface.

According to an aspect of the present invention, the bearing portion and the stopper have an approximately arc-shaped cross-section. Therefore, the bearing portion smoothly slides with respect to the stopper, thereby allowing smooth rotation of the plate-shaped member. In particular, According to an aspect of the present invention, the inner surface of the bearing portion and the lower surface of the stopper engaging the inner surface have an approximately equal radius of curvature. Therefore, friction of the bearing portion with respect to the stopper can be further reduced, thereby allowing more smooth rotation of the flat-plate member.

According to an aspect of the present invention, the lower layer of the plate-shaped member is a conductor. Therefore, when the pivot member is a conductor, the potential of the plate-shaped member can be established with an electrical contact between the pivot member and the plate-shaped member.

According to an aspect of the present invention, the lower layer of the plate-shaped member is an insulator. Therefore, an insulating film for insulating the group of electrodes from the plate-shaped member does not have to be formed. This leads to reduction in cost and optical deflecting apparatus manufacturing procedure.

According to an aspect of the present invention, the bearing portion, the regulating member, and the stopper are conductors. Therefore, with electrical contacts among these, even if the pivot member and the plate-shaped member are electrically separated, the potential of the plate-shaped member can be established.

According to an aspect of the present invention, the radius of curvature of the cross-section of the bearing portion and that of the stopper can be approximately equalized.

According to an aspect of the present invention, excellent light and dark control of pixels through ON/OFF control of the optical deflecting device can be achieved. Also, a high-speed operation can be achieved. Furthermore, high reliability can be achieved for a long time. Still further, driving can be made with low voltage. Still further, a contrast ratio can be increased. Therefore, an optical projecting device capable of high-definition image projection with a high contrast ratio can be achieved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical deflecting device comprising:
a substrate;
a pivot member formed on the substrate;
a regulating member formed on the substrate;
a plate-shaped member having an upper surface as a light reflecting surface; and
a group of electrodes formed on the substrate, wherein
the plate-shaped member has a loop-shaped bearing portion on a lower surface side,
the regulating member has a stopper protruding in approximately parallel to the substrate and embedded inside the bearing portion,
with an engagement of the lower surface of the plate-shaped member and an apex of the pivot member and an engagement of an inner surface of the bearing portion and a lower surface of the stopper, the plate-shaped member is rotatably supported with the apex of the pivot member as a center, and a position of the plate-shaped member in a rotation axis direction is regulated by a side surface of the regulating member facing a side surface of the bearing portion, and
with an electrostatic force generated between the group of electrodes and the plate-shaped member, the plate-shaped member is rotated with the apex of the pivot member as the center, thereby changing a reflecting direction of a light beam incident to the light reflecting surface of the plate-shaped member.

2. The optical deflecting device according to claim 1, wherein the bearing portion and the stopper have an approximately arc-shaped cross section.

3. The optical deflecting device according to claim 1, wherein the inner surface of the bearing portion and the surface of the stopper engaging the inner surface of the bearing portion have an approximately equal radius of curvature.

4. The optical deflecting device according to claim 1, wherein the plate-shaped member is formed of film-laminated layers, and a lower layer of the layers and the bearing portion are conductors.

5. The optical deflecting device according to claim 1, wherein the plate-shaped member is formed of film-laminated layers, and a lower layer of the layers and the bearing portion are insulators.

6. The optical deflecting device according to claim 4, wherein the regulating member and the stopper are conductors.

7. A method of manufacturing the optical deflecting device according to claim 1, the method comprising:
after planarizing a photoresist serving as a sacrifice layer, forming a concave surface corresponding to the bearing portion through etching process;
next forming a film made of a material serving as the lower layer of the plate-shaped member;
next forming and patterning a sacrifice layer along the concave surface; and
next forming a film serving as the stopper of the regulating member.

8. An optical projecting device comprising:
an optical deflecting device including
a substrate;
a pivot member formed on the substrate;
a regulating member formed on the substrate;
a plate-shaped member having an upper surface as a light reflecting surface; and
a group of electrodes formed on the substrate, wherein
the plate-shaped member has a loop-shaped bearing portion on a lower surface side,
the regulating member has a stopper protruding in approximately parallel to the substrate and embedded inside the bearing portion,
with an engagement of the lower surface of the plate-shaped member and an apex of the pivot member and an engagement of an inner surface of the bearing portion and a lower surface of the stopper, the plate-shaped member is rotatably supported with the apex of the pivot member as a center, and a position of the plate-shaped member in a rotation axis direction is regulated by a side surface of the regulating member facing a side surface of the bearing portion, and
with an electrostatic force generated between the group of electrodes and the plate-shaped member, the plate-shaped member is rotated with the apex of the pivot member as the center, thereby changing a reflecting direction of a light beam incident to the light reflecting surface of the plate-shaped member;
a light source that light up a light reflecting surface of a plate-shaped member of the optical deflecting device; and
an optical system that projects light reflected from the light reflecting surface when the plate-shaped member of the optical deflecting device is tilted in a first tilting direction, and shields light reflected from the light reflecting surface and prevents the light from being projected outside when the plate-shaped member is tilted in a second tilting direction.

* * * * *

UNITED STATES PATENT AND TRADEMARK OFFICE
CERTIFICATE OF CORRECTION

PATENT NO. : 7,277,217 B1  
APPLICATION NO. : 11/681021  
DATED : October 2, 2007  
INVENTOR(S) : Katoh et al.

Page 1 of 1

It is certified that error appears in the above-identified patent and that said Letters Patent is hereby corrected as shown below:

On the title page, Item (65), the Prior Publication Data has been omitted.. Item (65) should read:  
Title Page: Insert Item  
-- (65) Prior Publication Data

US 2007/0206268 A1   Sep. 06, 2007 --

Signed and Sealed this

Fifteenth Day of January, 2008

JON W. DUDAS  
*Director of the United States Patent and Trademark Office*